United States Patent
McLemore et al.

(10) Patent No.: US 6,626,090 B2
(45) Date of Patent: *Sep. 30, 2003

(54) COOKING APPARATUS

(76) Inventors: John D. McLemore, 105 Hickory Ct., Fortsom, GA (US) 31906; Don McLemore, 450 Brown Ave., Columbus, GA (US) 31906

(*) Notice: Subject to any disclaimer, the term of this patent is extended or adjusted under 35 U.S.C. 154(b) by 0 days.

This patent is subject to a terminal disclaimer.

(21) Appl. No.: 09/953,448

(22) Filed: Sep. 17, 2001

(65) Prior Publication Data

US 2002/0040644 A1 Apr. 11, 2002

Related U.S. Application Data

(63) Continuation of application No. 09/479,876, filed on Jan. 10, 2000, now Pat. No. 6,289,795, which is a continuation-in-part of application No. 09/092,812, filed on Jun. 5, 1998, now Pat. No. 6,012,382, and a continuation-in-part of application No. 09/092,814, filed on Jun. 5, 1998, now Pat. No. 6,029,566.

(51) Int. Cl.[7] ............................................. A47J 37/00
(52) U.S. Cl. ..................... 99/340; 99/385; 99/407; 99/449; 99/482; 126/275 R; 126/9 R; 126/26
(58) Field of Search .................... 99/400, 401, 340, 99/446, 449, 447, 385, 482; 126/275 R, 25 R, 9 R, 26, 41 R

(56) References Cited

U.S. PATENT DOCUMENTS

| | | | |
|---|---|---|---|
| 619,609 A * | 2/1899 | Pfister ...................... 126/275 R |
| 2,842,043 A | 7/1958 | Reuland ....................... 99/482 |
| 2,894,448 A | 7/1959 | Henderson et al. ........ 99/482 X |
| 4,446,776 A | 5/1984 | Gelfman ................... 99/447 X |
| 4,729,297 A | 3/1988 | Iranzadi ........................ 99/401 |
| 4,867,050 A | 9/1989 | Patenaude et al. ............. 99/400 |
| 5,025,715 A | 6/1991 | Sir ............................... 99/421 |
| 5,176,124 A | 1/1993 | Wrasse ..................... 126/25 R |
| 5,191,831 A | 3/1993 | Walden ........................ 99/446 |
| 5,359,923 A * | 11/1994 | Boswell ....................... 99/340 |
| 5,528,982 A | 6/1996 | Chuang ......................... 99/446 |
| 5,531,154 A * | 7/1996 | Perez, III ..................... 99/340 |
| 5,555,795 A | 9/1996 | Tsai .......................... 99/447 X |
| 5,768,977 A * | 6/1998 | Parris et al. .................. 99/340 |
| 5,881,709 A | 3/1999 | Daoust .................... 126/50 X |
| 6,065,466 A | 5/2000 | Baykal ...................... 126/41 R |
| 6,289,795 B1 * | 9/2001 | McLemore et al. ........... 99/400 |

OTHER PUBLICATIONS

Masterbuilt, Owners Manual for Monarch® and Master Barbeque® products.
Masterbuilt, "Outdoor Cooking Made Simple" product catalog (1998).
Masterbuilt, Assembly Instructions for 7–in–1 smoker (date not indicated).
Masterbuilt, Cook it–Carry it, Masterbuilt's Got it product catalogue (date not indicated).
Brinkmann, All in One, Owner's Manual, Assembly and Operating Instructions (date not indicated).

* cited by examiner

*Primary Examiner*—Reginald L. Alexander
(74) *Attorney, Agent, or Firm*—Smith, Gambrell & Russell

(57) ABSTRACT

A cooking apparatus for improved heat circulation and containment when smoking or grilling using electric, gas, or charcoal as the heat source. The base pan design enhances heat containment, and offers a channel design in the bottom of the base pan. A flame disk for even heat distribution is provided and can be used in conjunction with the base pan, and prevents internal food drippings from escaping through the disk. The disk design enhances the heat efficiency, and safeguards against drippings or ashes falling through to the burner or ground. The holes in the disk are raised, and has attached covers strategically placed over the holes to deter drippings or ashes from falling through. A fire pit container is also provided and designed for use with the base pan. The fire pit container supports a heat source such as a gas burner which directs a flame toward the base pan open hole and also toward the underside of a flame disk when a flame disk is suspended above the base pan hole.

38 Claims, 14 Drawing Sheets

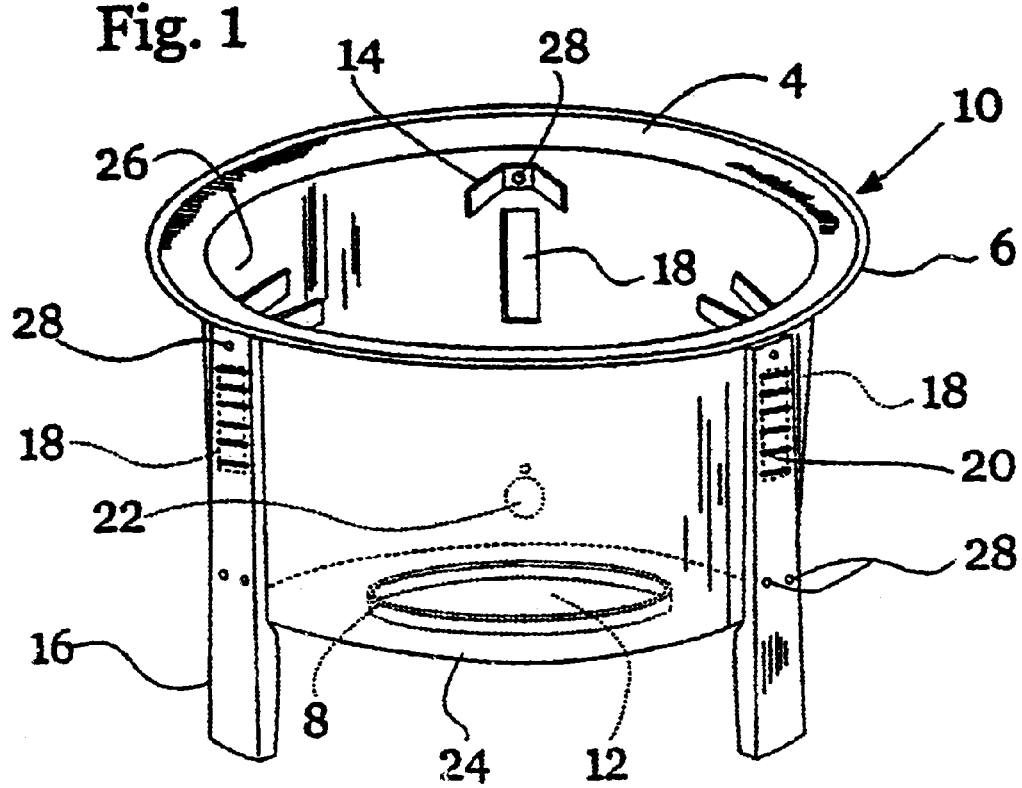
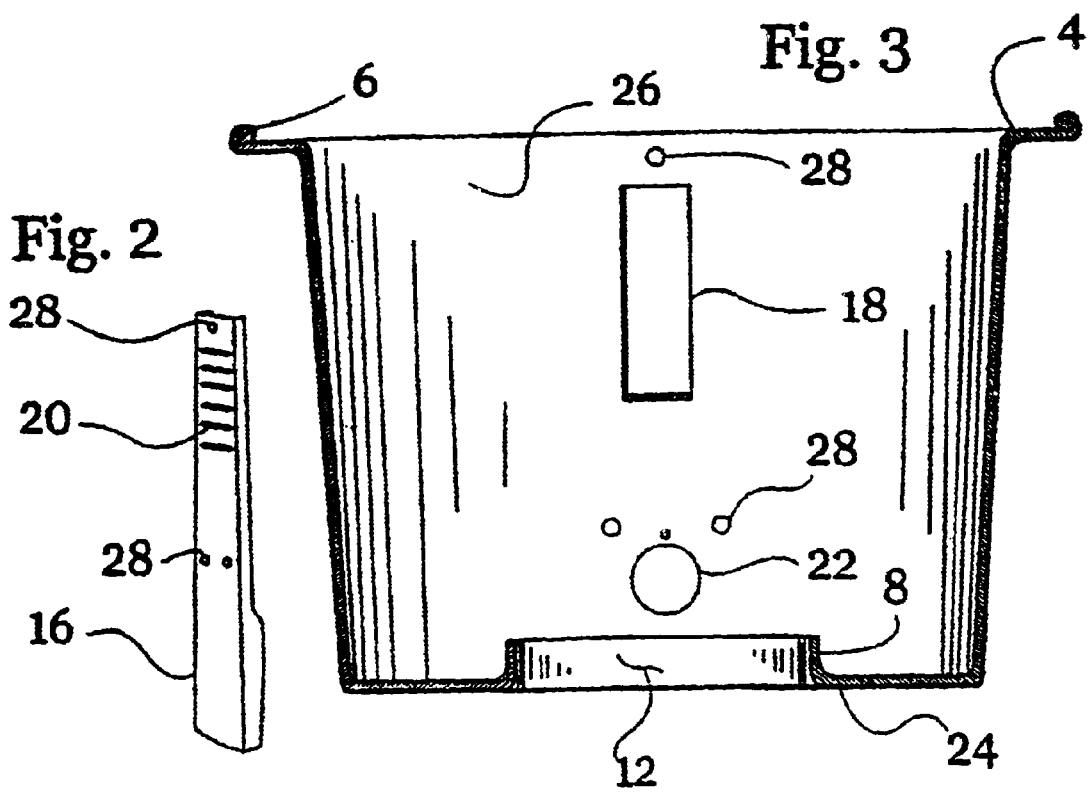

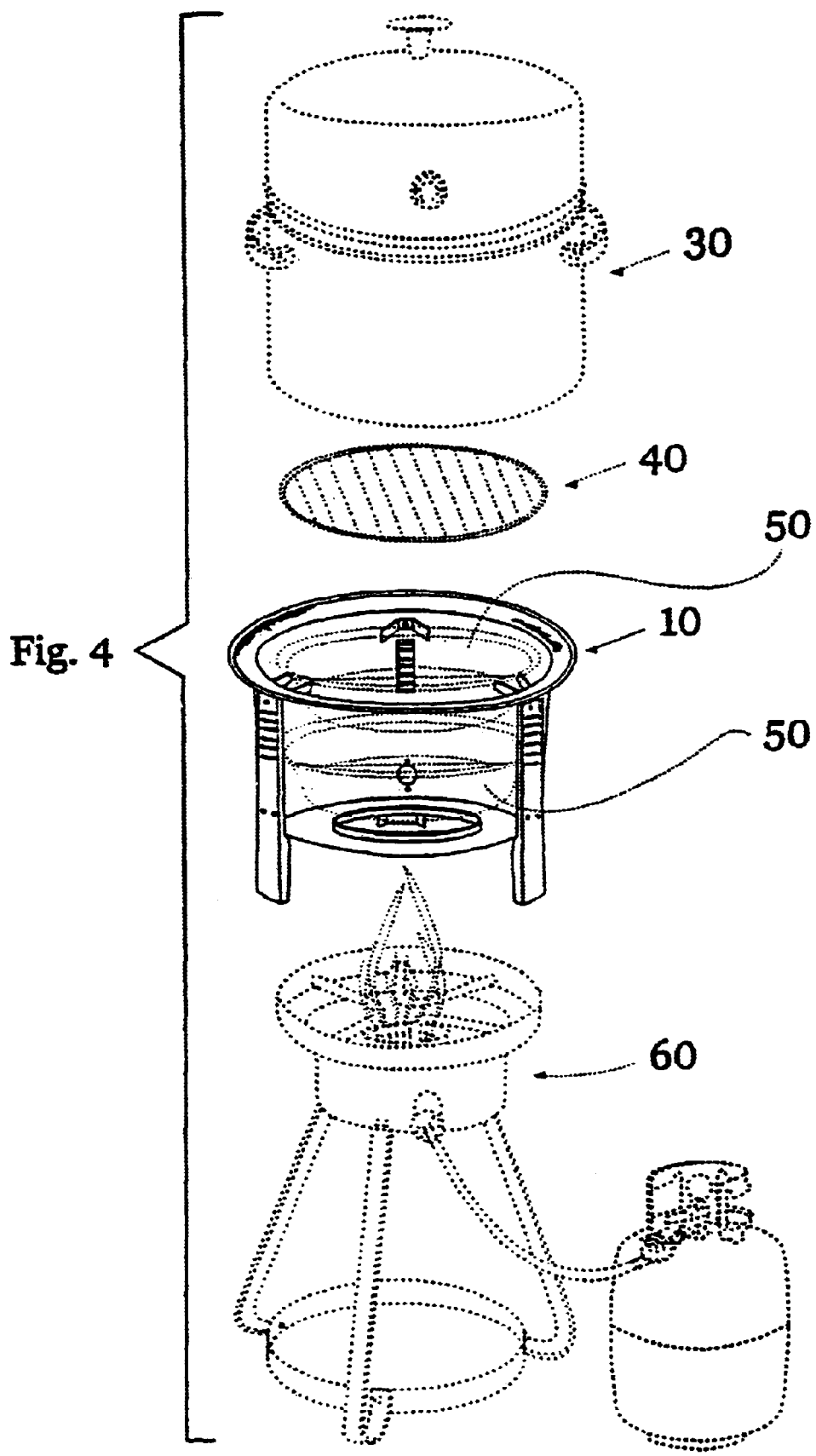

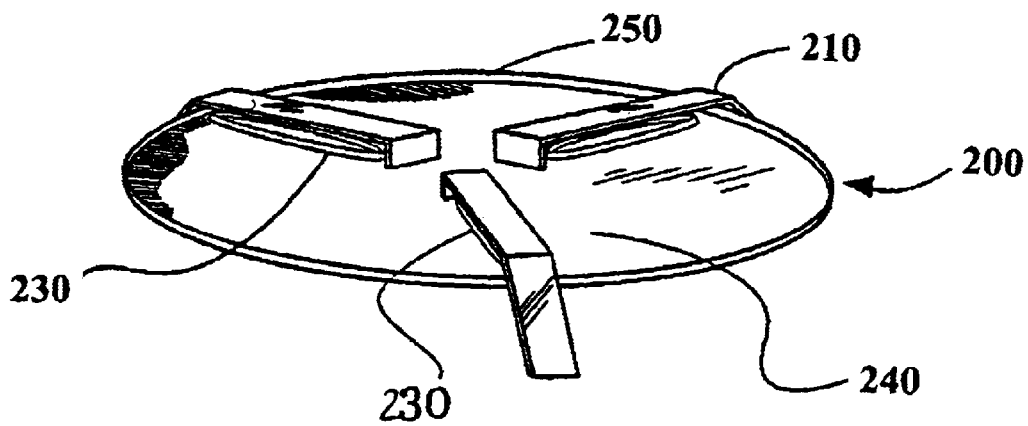
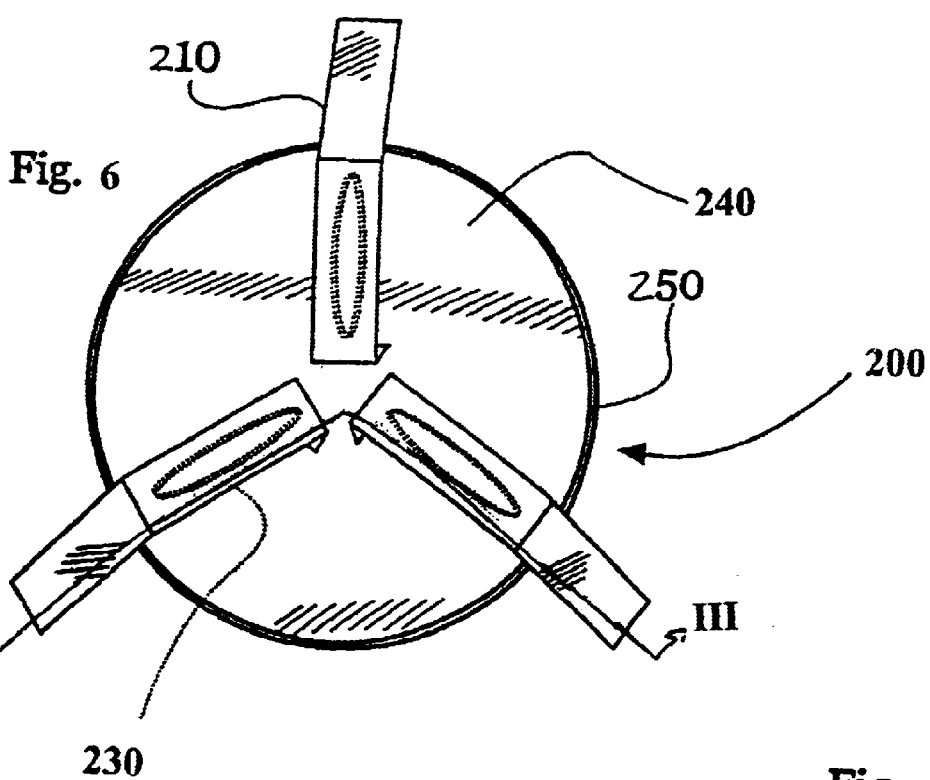
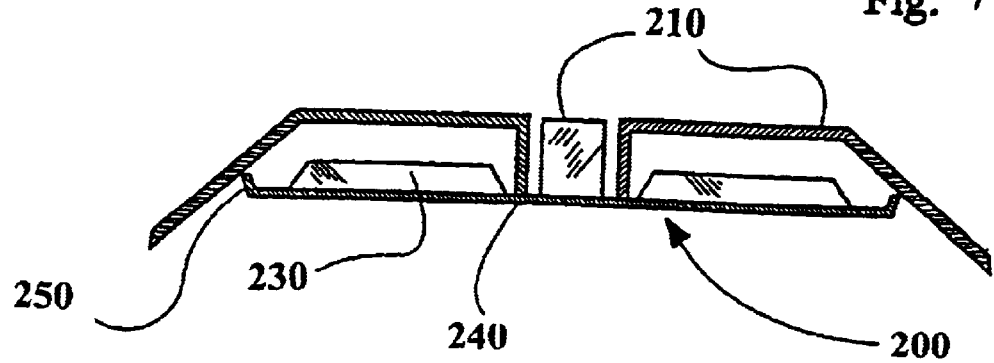

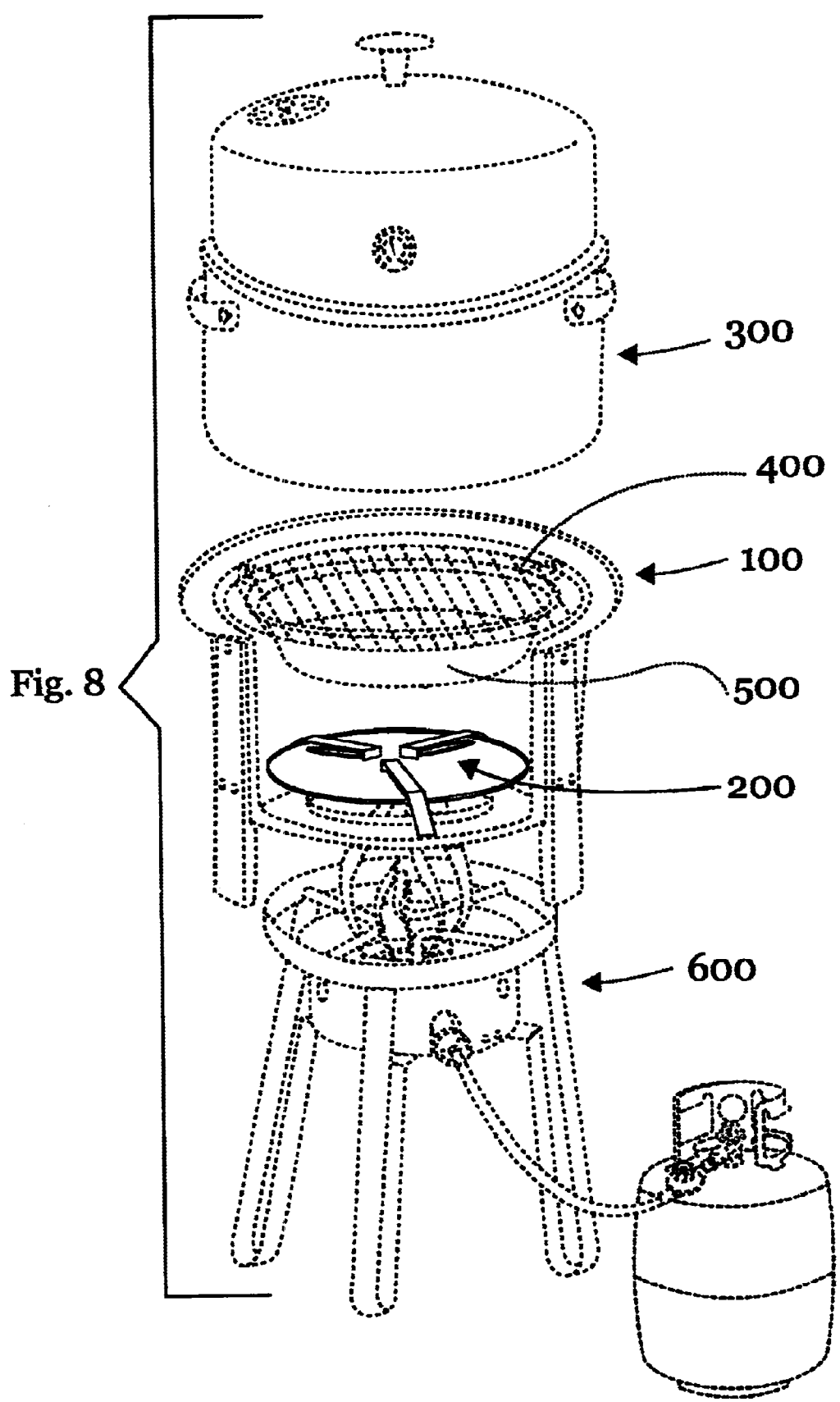

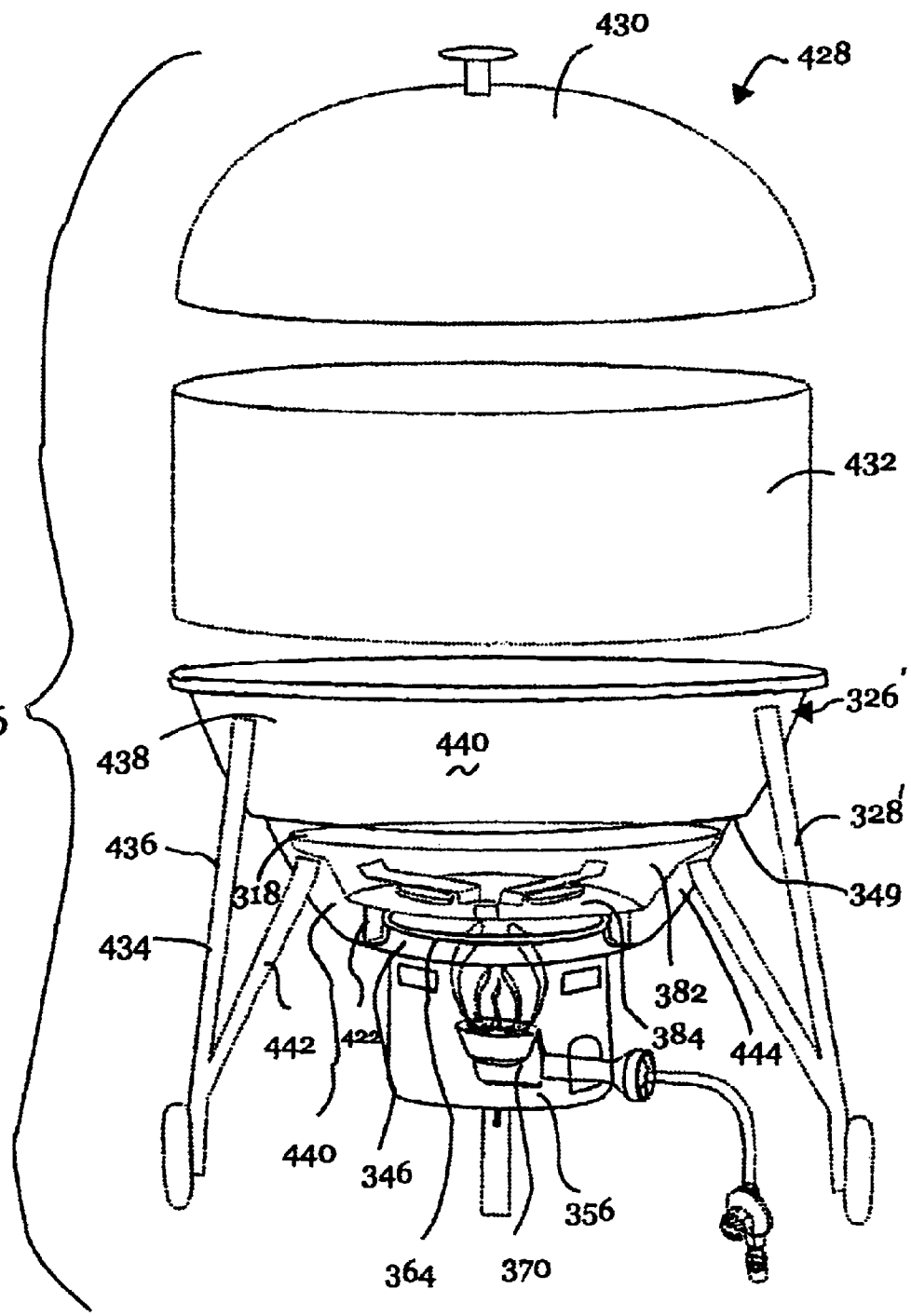

COOKING APPARATUS

CROSS REFERENCE TO RELATED APPLICATIONS

This application is a continuation of U.S. patent application Ser. No. 09/479,876, filed Jan. 10, 2000 (now U.S. Pat. No. 6,289,795), which is continuation-in-part of each of U.S. Ser. Nos. 09/092,812 now U.S. Pat. No. 6,013,382 and 09/092,814, now U.S. Pat. No. 6,029,566, each filed on Jun. 5, 1998 and each incorporated by reference herein.

FIELD OF THE INVENTION

This invention relates generally to the field of outdoor cooking, and more particularly to an apparatus for improved heat circulation and containment, and which prevents food drippings from escaping while cooking.

SUMMARY OF THE INVENTION

One aspect of the invention relates to a grill base design such as a base pan that allows for improved heat circulation and containment when smoking or grilling. The base pan design of the present invention enhances heat circulation and containment within the unit, and also offers a built in channel located in the bottom of the pan. The bottom of the base pan is designed with a large hole opening which creates a channel around the outside of the hole. This opening not only allows for improved air circulation, it is also positioned for the exterior gas flame to enter into the smoker or grill. In addition, the channel offers added protection against falling charcoal and ashes, which may fall from the bowl or plate inside the unit. Furthermore, the channel is designed to catch drippings from food. Adding water to the channel allows for easy clean-up and better condensation when water smoking.

Another object of the invention is its strategically placed air openings throughout the base pan. In addition to the opening at the bottom of the base pan, the base pan has holes for mounting legs and brackets, and a knockout hole when using an electric element. It also features three legs with vents that are designed to be placed over holes in the base pan located towards the top of the base pan.

The present invention features a base pan for smoking or grilling that comprises a main body having a bottom and side, with the side including a plurality of peripherally spaced apart vent openings. The base pan includes a plurality of legs each having an air vent, with the legs being secured to the main body so as to least partially cover respective vent openings provided in the main body such that there is air flow communication between said vent openings and corresponding air vents of said legs.

The base pan's legs each have a plurality of air vent apertures juxtaposed to the corresponding main body's air vent opening. In one embodiment, there are three legs circumferentially spaced about the side of said main body with each having a plurality of horizontal air vent slots that extend from side edge to side edge of the vent openings of the pan's main body. The legs are U-shaped in cross-section such that a channel is formed between an interior surface of each leg and an exterior surface of the side surface of the main body positioned below the corresponding vent opening in the main body.

The main body has an upper peripheral flange extending radially outward from the side of the main body and extending out over an upper opening in the channels formed by the legs. The flange has a rolled, peripheral upwardly extending edge. The legs have a covering section that extends over a full perimeter of the corresponding vent openings of the main body. The legs further include fastener holes and the side of the main body includes a plurality of leg fastening holes which are positioned in general vertical alignment with respective vent openings formed in the side, and the fastener and fastening holes are aligned so that the base pan can include a plurality of fasteners that extend through the fastener hole and fastening hole.

The base pan further comprises a plurality of grill rack brackets each having an attachment hole aligned with a fastener hole in a respective leg such that fasteners can extend through aligned fastener holes in the legs and fastening holes in the side and through attachment holes in the brackets.

An embodiment of the invention features a base pan wherein the bottom of the main body has a center opening, and wherein the center opening is defined by an edge extension extending upward off the bottom of the main body, which edge defines a bottom channel between the side of the main body and the edge extension. The embodiment of the invention also features an arrangement wherein the side and edge extension each extend vertically with the side extending vertically higher than the edge extension.

The base pan embodiment noted above can further include an electrical element knock out hole in the base pan side that is in general vertical alignment with one of the vent openings formed in the main body.

Thus, in one embodiment of the invention a base pan for smoking or grilling is provided having a main body with a bottom and a side wall, the side wall extending vertically upward from the bottom to an upper side wall end, the side wall including a plurality of peripherally spaced apart vent openings formed within the side wall below the upper side wall end and above the bottom. Also, a plurality of legs are secured to the main body, the bottom of the main body has a central opening, and the central opening and vent openings in the side wall are in air circulation communication so as to promote air circulation within the base pan during smoking or grilling. The central opening is defined by a vertically extending edge extension which forms an annular channel between the side wall and edge extension. The main body includes an upper flange extending radially out from the upper side wall end, and the legs have a leg section with air vents formed therein. The leg section is positioned over and covers a corresponding one of the vent openings in the main body. The leg sections have a U-shaped cross section with an outer wall and two side extensions, and the side extensions are in contact with the main body and the outer wall is spaced from the main body, and the leg section forms part of the outer wall. The noted embodiment features three vent openings in the side wall that are circumferentially spaced apart. Also, the base pan has each vent opening represented by a continuous peripheral vent edge that has all points lying on a common cylindrical surface.

In addition, the invention features a smoker grill assembly that includes a base pan that has a main body with a bottom and side, the side including a plurality of peripherally spaced apart vent openings. The base pan further comprises a plurality of legs each having an air vent, with the legs being secured to the main body so as to least partially cover respective vent openings provided in the main body such that there is air flow communication through the vent openings and corresponding air vents of the legs, and the base pan having a central opening in the bottom of the main body. The smoker grill assembly further includes a grill supported by the base pan, a covering body supported by the base pan and positioned so as to cover the grill, and a gas cooker having a flame producer which directs a flame though the central opening in the base pan.

Another aspect of the invention relates to a flame disk design that helps distribute the flame from the burner evenly throughout the unit for direct grilling, or when burning wood chunks when smoking. The disk also prevents internal food drippings or ashes from escaping through the disk, while allowing heat to pass through. The flame disk design is heat efficient and safeguards against drippings or ashes falling through to the burner or ground. The holes in the disk are raised to deter food drippings and ashes from falling through to the ground, while adding rigid strength to the disk. The disk has attached support cover legs, which lifts the disk on its cooking base. In one embodiment a member such as an inner extension of the legs are strategically placed over the raised holes in the disk, which adds additional protection against food drippings escaping through the disk holes, while also allowing heat to pass through while cooking.

Another feature of the invention is the providing of a disk that is designed to protect the burner. The disk is also designed for easy removal, which allows for quick clean up. Still yet another feature of the invention is the disk has a series of raised holes for optimum heat placement, and allows for more efficient burn time when smoking with wood. A further feature of the invention is the disk design allows for better insulation keeping more heat inside the unit when grilling or smoking, for instance.

The invention thus features a flame disk that is particularly well suited for use with the above described base pan with the legs of the flame disk finding support in the channel area of the base pan formed between the center opening edge extension and the base of the other side wall. The flame disk preferably comprises a plate having a peripheral edge and a plurality of holes formed internally of the peripheral edge as well as leg supports. The leg supports being connected with said plate and said leg supports having a lower contact end positioned below the plate so as to place the plate in a suspended state with respect to the leg supports, and the leg supports having an upper section which extends over the holes so as to cover the holes. In an embodiment of the present invention each of the holes is defined by a raised extension extending upward from a base portion of the plate. The plate is further defined by a raised peripheral edge which extends upward from the base portion of said plate, with the raised extension of said holes extending vertically up from the base portion of said plate to a greater extent than that of the raised peripheral edge.

In an embodiment of the invention, an upper edge of each of the holes defines an exit opening having an exit opening perimeter, and the upper section of the support legs extends over respective exit openings and each of said upper sections has a covering area which exceeds an area defined by the exit opening perimeter being covered such that the upper sections completely cover, from a plan view perspective, the exit openings. The upper sections extend parallel with an upper face of the base portion of the plate in the noted embodiment. In addition, the leg supports include an internal extension which extends from an internal end of respective upper sections into contact with the upper face of the base portion. The internal sections are arranged so as to extend transversely with respect to both said upper section and said base portion.

An embodiment of the present invention also features leg supports that include an outer section extending radially out from an outer end of said upper section, and said outer section including a sloped section that extends to the lower contact end of the leg supports, and the sloped section has a slope which places an interior surface of the sloped section in a flush relationship with respect to the raised outer edge of the circular plate, with the upper face of said plate being suspended at about an intermediate height of a rise in said sloped section.

In an embodiment of the invention, the plate has a plurality of raised edges defining the holes which raised edges extend radially in a common direction with a radial extension of the upper section of the leg supports. Also, the raised edges have an oblong shape with a radial length that is less than a radial extension of the upper section and a maximum circumferential width that is less than that of a corresponding upper section so that the upper extensions completely cover over corresponding oblong shaped holes. In one embodiment there are three individual leg supports and three oblong shaped holes formed in the plate.

In an embodiment of the invention, the invention provides a flame disk for use in an outdoor cooking apparatus that comprises a plate having a raised peripheral edge and a plurality of holes internally of the raised peripheral edge, and the holes being defined by raised extensions extending up from a face portion of the plate. The flame disk further including hole coverings that extend vertically above an upper edge of respective raised extensions so as to completely cover the holes, when viewed in a plan view perspective. The supports are in contact with the plate such that the plate is suspended above a surface contact end of the supports. The flame disk features supports that are defined by individual leg members each having a lower section which includes the contact end and an upper section which defines one of the hole coverings. The hole coverings are arranged so as to be free from contact with the raised extensions defining the holes. The holes extend radially in alignment with a radial extension of the leg members, and each of the leg members includes an internal section that extends from an interior end of a corresponding one of the hole coverings into contact with the face portion of the plate. In an embodiment of the invention, each leg member includes an outer section extending radially out away from the raised peripheral edge of the plate and has a free end defining the surface contact end of the supports. The outer section slopes downward from between the raised peripheral edge and the surface contact end. Also, an interior surface of the outer section contacts the raised peripheral edge of the plate. With this embodiment of the invention, the holes extend radially between a radial inner end and a radial outer end, and the hole coverings extend both radially inward of the radial inner end of the holes and radially out away from the radial outer end of the holes, and the hole coverings extend parallel to the upper face of the plate.

The invention also features a smoker grill assembly that comprises a base pan having a side wall and bottom with the bottom including a heat passage opening and a flame disk positioned within the base pan and over the heat passage opening. The flame disk includes a plate having heat passage openings and legs which support the plate in a suspended state with respect to the bottom of the pan, and the legs being in a non-connected state with respect to the base pan for easy removal. Under this embodiment of the invention, the heat passage openings in the plate are defined by raised extensions extending off a face surface of the plate and the legs have hole covering sections that extend above the heat passage openings so as to completely cover the heat passage openings from a plan view perspective. Also, in this embodiment the plate includes a raised peripheral edge which extends upward off the face surface of said plate to a lesser extent than that of said raised extensions defining the heat passage openings. There are also a plurality of circumferentially spaced heat passage openings and an equal number of legs with hole covering sections extending over the heat passage openings, and the leg members each include an internal support section extending between an interior end of a corresponding one of said hole coverings into a connective relationship with respect to the face surface of the plate and an external support section extending radially out from a peripheral edge of the plate such that the hole coverings are suspended above the heat passage openings. The base pan has a central circular opening and the plate is circular, and the plate has a diameter that is more than that of the central circular opening in the base pan. The smoker grill assembly further comprising a cooking unit with a heat source positioned centrally of the bottom of the base pan so as to direct heat though the central opening in the base pan and a covering dome member dimensioned for covering an open top end of the base pan.

The present invention also features a base pan embodiment which features a central opening in the bottom of the pan with the central hole being defined by a raised extension. The raised extension is preferably a rolled edge that is continuous about a central opening in the pan's horizontal bottom plate. The base pan further includes a side body which includes a lower section in the form of an outwardly diverging curved side wall with a generally frusto-conical configuration. This lower section preferably extends up from the periphery of the base plate to an intermediate step shoulder. The pan side body also includes an upper section in the form of an outwardly diverging curved side wall which extends up from the periphery of the support shoulder so as to have a minimum diameter greater than that of the maximum diameter of the lower section. The upper section also has a generally frusto-conical configuration and extends upwardly off from the outer periphery of the step shoulder up to the upper rim of the pan. The upper rim of the base pan includes an outwardly extending support section for supporting a cooking apparatus component, (e.g., a cover, a smoker extension and/or a grill rack) with an upwardly bent or rolled peripheral edge.

The raised extension surrounding the central hole extends sufficiently upward to define a fluid capture channel between the extension and the pan side body.

In one embodiment the base pan is free of integral or attached supports, such as secured legs. With this embodiment, the base pan can be supported on an underlying support stand such as one having a ring for contact with the underside of the base pan's bottom plate around the central hole, or a larger diameter support object which makes contact with the underside of the step shoulder, or the underside of the base pan's upper flanged rim. In the latter two situations, the base pan can be set in position within a supporting cut-out of a support structure in similar fashion in which a sink is installed.

In an alternate embodiment the base pan includes an attached or integrated support assembly which suspends the bottom plate with central opening off away from an underlying surface. In a preferred embodiment, a tripod arrangement is provided with two legs including wheels and a third, longer leg member not including wheels to provide a position retention function. The legs are preferably attached at their upper end to the upper section of the base pan's side wall.

An alternate embodiment of the invention features a base pan assembly which includes one of the above-described base pan embodiments together with a cooking unit in the form of a "fire pit" container. As also made clearer below, "fire pit" is used in a broad sense to include the preferred gas burner head support container specifically described herein as well as other supported heat sources such as combustibles (e.g., charcoal), electric resistance units, etc. The preferred fire pit container features a container body with a bottom and a side wall with an upper end. The fire pit container is designed for reception within the central opening of the base pan. The fire pit container is suspended from the bottom of the base pan and has means for suspension support with respect to the raised extension. One means for suspension support includes providing the upper edge of the container with a peripherally continuous (or interrupted) lip flange which extends radially out sufficiently far enough to both catch and be supported by the upper free edge of the raised extension. As the container's side wall is of a diameter less than the interior side surface of the raised extension (preferably by a slide contact relationship or within a half inch clearance), the container can be easily inserted by insertion of the container downward through the central hole until its upper lip flange comes in supporting contact with the raised extension. In addition, releasable (e.g., circumferentially spaced spring strips secured to the lip) attachment means can be utilized, but in a preferred embodiment reliance is placed solely on contact support.

In one embodiment of the invention, the fire pit container preferably is designed to support a gas (e.g., propane) burner head and thus features a reception passageway formed to receive a portion of the burner or the conduit leading thereto and means for securing the head in a stable position such as a hole for reception of a nut/bolt combination of the burner head, a clamping arrangement, a recessed area, or the like. In addition, air vents are preferably provided in the container to facilitate burner operation. To provide for a suspended container, the vertical height of the container, while in a support arrangement with the base pan, is of a height sufficient to place the container in a suspended state with respect to an underlying support above which the base pan is suspended by way of, for example, the aforementioned tripod arrangement.

The present invention also features a further embodiment of a flame disk which is particularly well suited for use in a fire pit assembly as described below and thus is referred to as a fire pit flame disk for convenience, although other flame disk embodiments such as those described above are also suitable for use with the base pan fire pit assembly, described in greater detail below. The fire pit flame disk comprises preferably a flat bottom plate with an elongated peripheral side body wall extending upwardly and obliquely from the peripheral edge of the base plate. The side body wall features an intermediate stepped outward extension which provides a grill reception support platform, which grill reception platform provides means for supporting supplemental or replacement heating sources such as wood logs, lava rocks, heating embers or the like. For example, a gas burner provided in the fire pit container can be activated to ignite a plurality of wood logs and then shut off once the logs have reached a sufficient burning state. This provides for an efficient operating smoker and avoids undue gas usage. The grill supported on the flame disk can also provide a support for food products, although most food products are better suited for cooking on a grill rack supported on the base pan as described below.

Within the flat plate there are provided a plurality of preferably oblong shaped, radially extending holes with vertically raised peripheral extensions so as to provide a plurality of louvers. The louvers extend from close to the peripheral outer edge of the plate (e.g., within the radial outer 25% region of the plate) while the inner edge is spaced outward from an internal uninterrupted area having a radial distance of at least 12% of the total radial distance. The louvers preferably extend across at least a majority of the radial distance of the base plate and preferably 60 to 80% of that distance.

The raised extension is sufficiently high to trap drippings from food products above the base plate and provide for water steaming. That is, liquid is retained external to the extensions and internal to the side body wall.

To further prevent drippings and other liquids from dripping below the flame disk and to provide for a high quality dissipation of heat while avoiding direct flame contact on food stuffs, louver covers are positioned above each of the raised louver extensions. Over each louver (e.g., three equally circumferentially spaced) there is positioned a louver cover with each louver cover having a sufficient width so as to cover the widest portion of each hole and preferably overlap (e.g., a quarter to a third width section extending outward from a respective louver outermost edge to form an overlap) the boundary of that hole.

Preferably, the louver cover is independent of the raised extension both from a radial contact with plate positioning standpoint and a height clearance stand point. A preferred embodiment of the fire pit flame disk features an internal section which is connected to the uninterrupted central area of the flame disk's base plate between the center point of the plate and the interior edge of an adjacent most raised louver extension, e.g., a bent tab weld secured to the plate with an upwardly extending portion positioned at an internal end of the cover. Extending outwardly from the cover's internal section is an intermediate section of the cover which includes a hole covering portion preferably in the form of a strip of material that extends radially internally of the inner end of the raised louver extension to a location radially externally of the outer end of the raised louver extension. The cover preferably further comprises an outer section which supports the cover external to the radial outer end of the louver hole. In a preferred fire pit flame disk embodiment, the outer section includes a side body wall attachment portion such as an upwardly bent tab that is angled to conform to the divergent side body wall of the flame disk (e.g., welded tab) at a location below the stepped shoulder formed in the fire pit flame disk side wall. The hole covering portion preferably is a flat metal strip extending parallel to the flame disk's base plate and at a height above the upper edge of the louver extension that allows for heat dispersion via a flow of air within and out away from the clearance space between the upper edge of the raised extension and the above positioned hole covering portion. Also, by having the hole covering portion spaced below the level of the grill supporting stepped shoulder in the fire pit flame disk, heat is also more readily free to flow in a convective current above the hole covering portion and below the grill.

Alternatively, the hole covering portions can be provided along a common horizontal plane with that of the contact portion of the grill support shoulder to provide an internal support region for a food stuff, food container or secondary heat source grill or rack.

One embodiment of the fire pit flame disk features a suspension support such as a plurality of circumferentially spaced legs which extend down from an upper attachment location with either the flame disk's side body wall and/or base plate. In a preferred embodiment there are a plurality of circumferentially spaced legs, each having a leg section with a lower end for contact with an underlying support such as the channel region of a base pan formed between the base pan's central hole extension and the base pan's side wall. In a preferred embodiment, there are an equal number of legs as louver holes with the legs being equally circumferentially spaced apart from each other and at a location between an adjacent pair of the louver holes. The legs also are preferably formed of strip material that is bent into an L-shape with a horizontal section welded or otherwise secured to the bottom of the flame disk base plate and the other leg section extending vertically down in a transverse relationship with the attached section.

The height of the vertical extension portion of the legs is sufficient to place the flame disk's base plate above, in a height clearance relationship, the upper edge of the base pan's central hole extension (or the lip flange of a fire pit burner container support flange supported on the central hole extensions' upper edge). In this way, a convective flow of heat is possible—radially and between the circumferentially spaced flame disk legs and along and over the side body wall of the flame disk. The height of the flame disk side body wall is preferably arranged so as to be less than the height of the lower section of the base pan's side body wall such that the upper edge of the flame disk's side body wall is positioned below the stepped shoulder formed in the side wall of the base pan. While a height clearance is provided, the flame disk helps in containment and equal dispersion of the heat generated there below.

Other objects and advantages of the present invention will become apparent from the following descriptions, taken in connection with the accompanying drawings. Wherein, by way of illustration and example, embodiments of the present invention are disclosed. The drawings constitute a part of this specification and include exemplary embodiments to the invention, which may be embodied in various other forms.

BRIEF DESCRIPTION OF THE VIEWS OF THE DRAWINGS

FIG. 1 is a perspective view of a first embodiment of the smoker grill base pan with channel design.

FIG. 2 is a perspective view of a base pan leg shown in FIG. 1.

FIG. 3 is a cross-sectional view of the smoker grill base pan with channel design.

FIG. 4 is an exploded view showing a smoker grill assembly and where the smoker grill base pan with channel design is placed.

FIG. 5 is a perspective view of a first embodiment of a smoker grill flame disk of the present invention.

FIG. 6 is a top view of the smoker grill flame disk of FIG. 5.

FIG. 7 is a cross-sectional view of the smoker grill flame disk taken along cross-section line III—III in FIG. 6.

FIG. 8 is an assembly view showing the flame disk in position with respect to a smoker grill assembly.

FIG. 16 shows a fire pit cooking assembly which features a fire pit base pan assembly together with a cover, side wall extension as well as a fire pit flame disk.

DETAILED DESCRIPTION OF THE INVENTION

Figure 10:
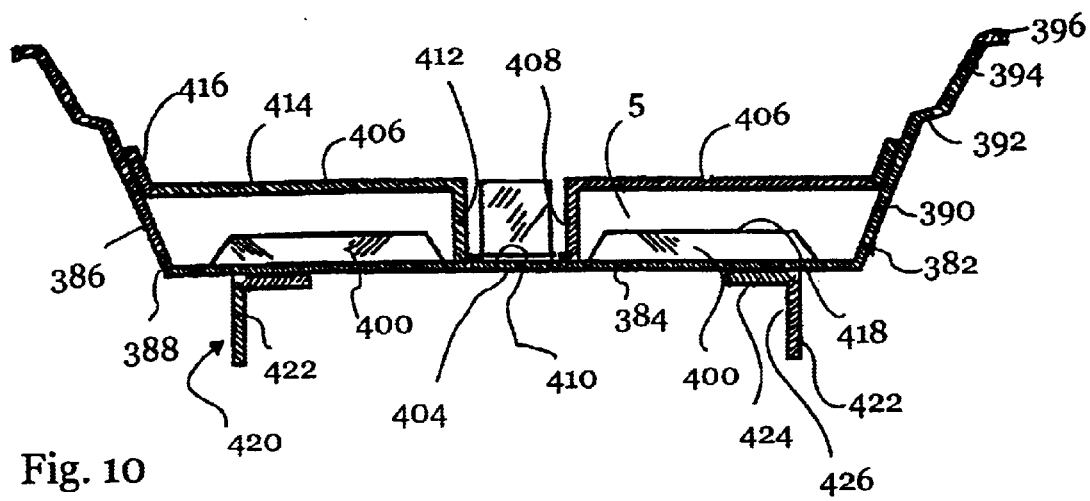
FIG. 10 shows a cross sectional view taken along cross-sectional line X—X in FIG. 9.
Figure 9:
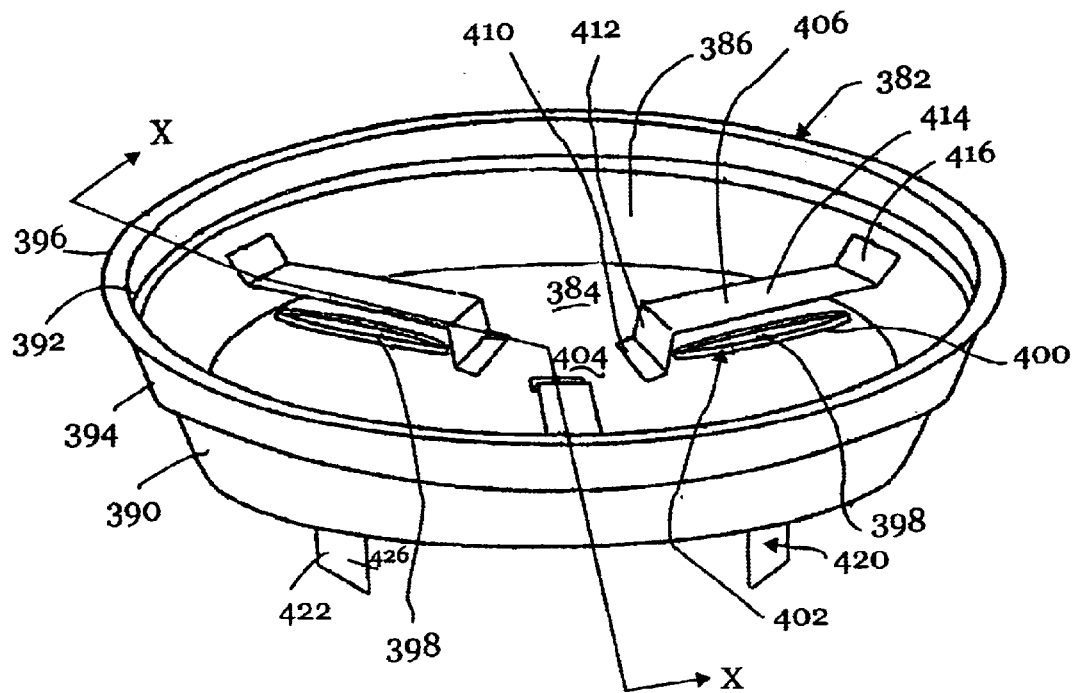
FIG. 9 shows a top perspective view of another flame disk embodiment.
Figure 11:
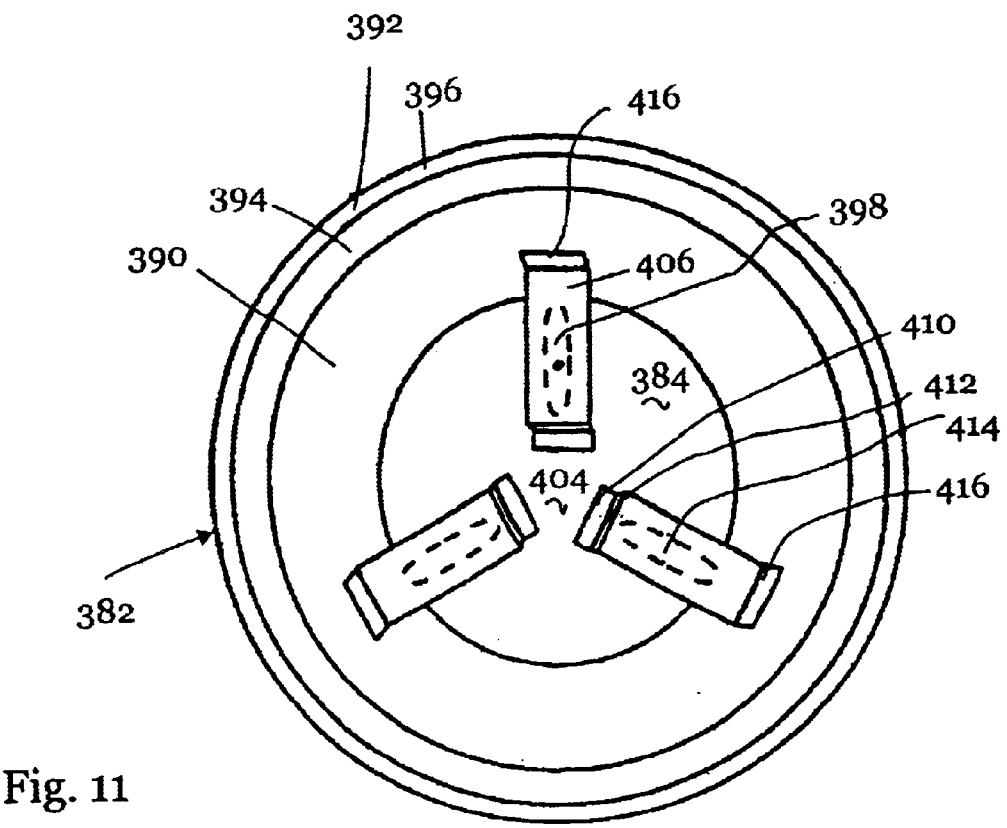
FIG. 11 shows a top plan view of that which is shown in FIG. 9.
Figure 12:
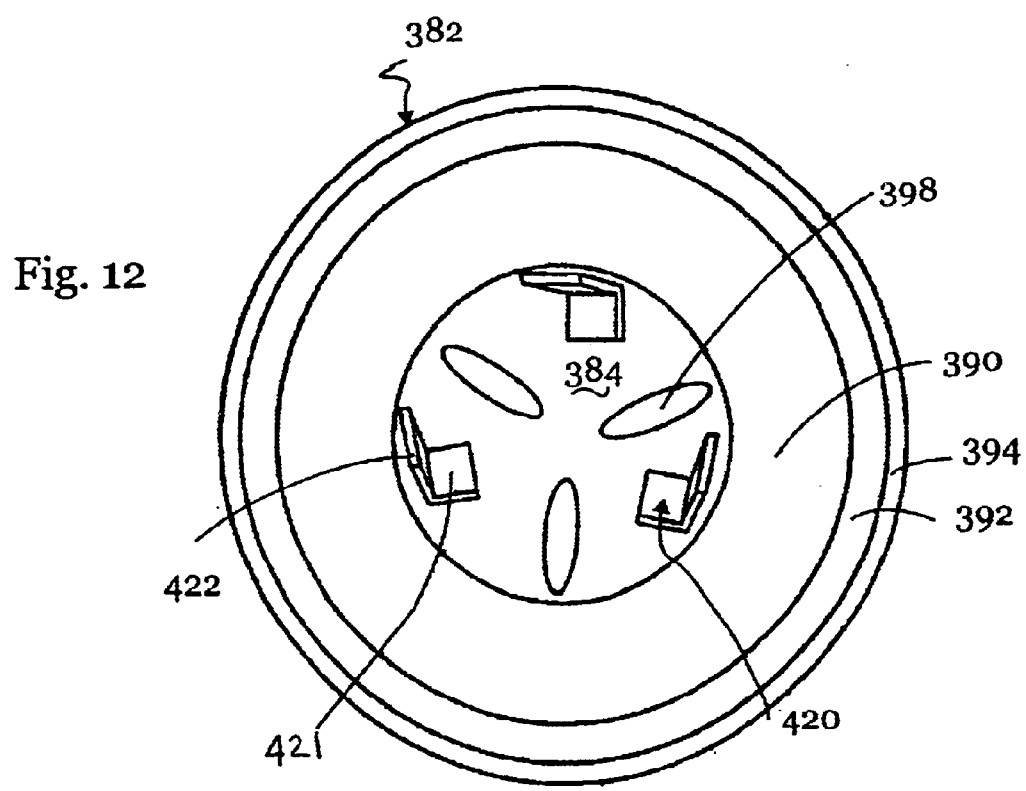
FIG. 12 shows a bottom plan view of that which is shown in FIG. 9.

A detailed description of some preferred embodiments of the invention is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

In FIG. 1 there is shown base pan 10 having flat top edge 4 with rolled edge 6. FIG. 1 also provides a perspective view of the inside rolled edge 8 forming the channel. As shown in FIG. 1, rolled edge 8 defines raised center hole 12 in the base pan. Base pan 10 further comprises bracket 14 for holding the grill rack 40 (FIG. 4) and base pan legs 16 which extend over corresponding air vent holes formed in the side of base pan 10. In each base pan leg 16 there is provided a plurality of vented air holes 20 which provide a plurality of continuous air vent passageways in the base pan. FIG. 1 further illustrates knockout hole 22 for the placement of an electric element.

As shown FIGS. 1 and 3, base pan 10 includes bottom channel 24 positioned radially externally to inside rolled edge 8. Extending upwardly from the outer periphery of bottom channel 24 is side body 26 of the base pan within which is formed mounting holes 28 for legs and brackets.

FIG. 2 provides a perspective view of one base pan leg 16 in a detached state having a series of spaced vented air holes provided in the base pan legs 16 which air holes extend within the confines of air vent hole 18 when leg 16 is secured to side body 26 of base pan 10 by way of holes 28 for mounting legs and brackets. FIG. 2 also illustrates leg 16 as having a U-shaped cross-section that, as shown in FIG. 1, provides a vertical channel arrangement when the leg is mounted to side body 26.

FIG. 3 provides a cross-sectional view of the flat top edge 4 leading to rolled edge 6. FIG. 3 also shows a cross-sectional view of the inside rolled edge 8, forming the base pan's bottom channel 24, and channel hole 12 in the center of the base pan. FIG. 3 further illustrates the air vent hole 18 formed in the side of main body 26 of the base pan as well as holes 28 for mounting the legs and brackets.

FIG. 4 provides an exploded view of the smoker grill base assembly that illustrates base pan 10 and its relationship with respect to smoker body and dome 30, grill rack 40, water bowl 50, and gas cooker 60.

The above described invention thus provides an apparatus for improved heat circulation and containment, and which prevents food drippings from escaping when smoking or grilling using electric, gas, or charcoal as the heat source. The features of the described apparatus include:

A) The base pan offers improved heat containment.
B) The base pan is designed for improved air circulation.
C) The base pan has a built in channel in the bottom of the pan.
D) The base pan is designed with a large hole opening, which promotes air circulation, and creates the channel design.
E) The base pan is designed with strategically placed openings, and has detachable legs with vents that are placed over the openings.
F) The channel offers added protection against failing charcoal, ashes, and drippings.
G) The channel is designed for water placement, allowing easy clean-up and better condensation when water smoking.
H) The base pan has an interchangeable design, allowing the use of gas an electric element, or charcoal as the heat source.
I) The design of the base pan allows the use of an external gas burner and does not affect the bottom of the base pan.

FIG. 5 provides a perspective view of flame disk 200 with support and cover legs 210 connected with round metal disk 240.

FIG. 5 also illustrates raised hole 230 provided in flame disk 200.

Round metal disk 240 is further shown to include raised edge 250 provided on the periphery of metal disk 240. FIG. 6 provides a plan view of flame disk 200 with support and cover legs 210. Further, FIG. 6 provides in its plan view an illustration of the relative positioning of the covering section of support and cover legs 210 with respect to raised holes 230 provided in metal disk 240 of the smoke grill flame disk 200.

The plan view of FIG. 6 also further illustrates the round metal disk's raised edge 250.

FIG. 7 provides a cross-sectional view taken along cross section line III—III in FIG. 6. As shown in FIG. 7, flame disk support and cover legs 210 of flame disk 200 extend completely over, in the radial direction, raised holes 230 of the round metal disk 240. FIG. 3 shows raised edge 250 on disk 240 in abutment with the sloping section of each of legs 210.

FIG. 8 illustrates the flame disk in use within a smoker grill assembly including the relative placement of the smoker grill base 100, the relative positioning of the smoker grill flame disk 200 inside the smoker grill assembly, the relative positioning of the smoker body and dome 300, the relative positioning of grill rack 400, the relative positioning of the water bowl 500, and the relative positioning of the gas cooker 600.

The above described invention thus provides an apparatus for helping to provide even heat distribution when using an external flame and for helping to prevent internal food drippings from escaping through the disk. The features of the above described flame disk includes the providing of a disk design that—

A) is heat efficient;
B) safeguards against drippings or ashes falling to burner or ground;
C) helps provide better performance when cooking; and
D) includes holes in the disk that are raised, and has attached legs strategically placed over the raised holes in the disk, which adds additional protection against food drippings and ashes from escaping through the disk holes to the burner ground.

Figure 13:
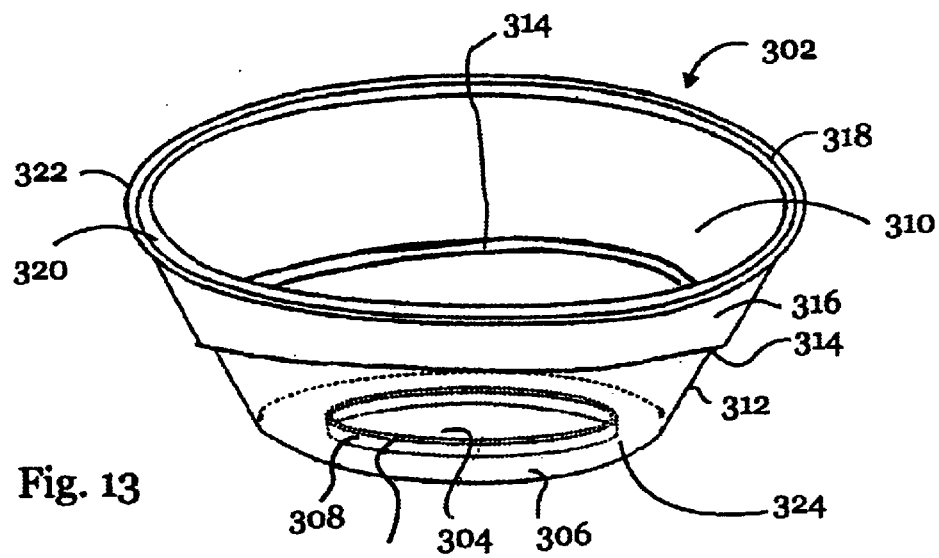
FIG. 13 shows a top perspective view of an alternate base pan embodiment of the present invention.

As shown in FIG. 13, the present invention also features an alternate base pan embodiment 302 having central opening 304 in the bottom 306 of the pan with the central hole being defined by raised extension 308. Raised extension 308 is preferably a rolled edge that is continuous about central opening 304 in the pan's horizontal bottom plate. Base pan 302 further includes side body 310 which, in this embodiment, includes lower section 312 in the form of an outwardly diverging curved side wall with a generally frusto-conical configuration. Lower section 312 extends up from the periphery of the bottom base plate 306 (flat or curved cross-section) to intermediate step shoulder 314. Pan side body 310 includes upper section 316 in the form of an outwardly diverging curved side wall having a minimum diameter greater than that of the maximum diameter of the lower section with the difference defined by shoulder 314. Upper section 316 also has a generally frusto-conical configuration and extends upwardly off from the outer periphery of step shoulder 314 to the upper rim 318 of pan 302. The upper rim 318 of the base pan 301 includes an outwardly extending support flanged section 320 for supporting a cooking apparatus component, (e.g., a cover, smoker extension, grill rack or some other cooking apparatus component) and extends into an upwardly bent or rolled peripheral edge 322.

Raised extension 308 surrounds the central hole and extends sufficiently upward to define fluid capture channel 324 formed between the extension 308 and lower section 312 of the pan side body 310.

Figure 17:
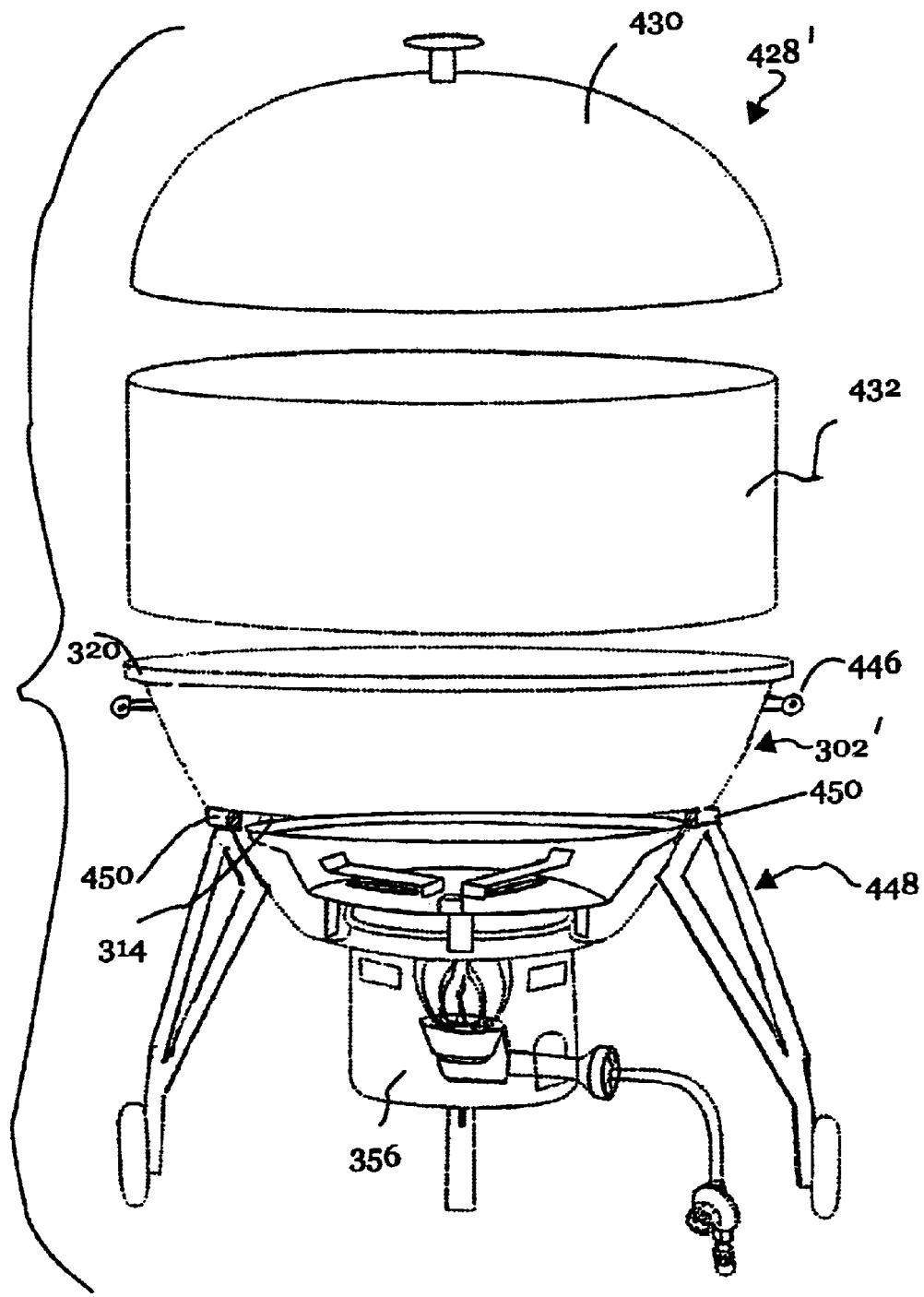
FIG. 17 shows an assembly like that in FIG. 16 but with the fire pit base pan of FIG. 13 (with added optional handles).

Base pan 302 is free of integral or attached supports such as legs. With this embodiment, the base pan can be supported on an underlying support stand such as on the top ring of a propane burner 60 as shown in FIG. 4 or on a support having a ring for contact with the underside of the base pan's bottom plate around the central hole, or a larger diameter support object which makes contact with the underside of the step shoulder (as shown in FIG. 17 and described in greater detail below) or the underside of flanged support section 320.

Figure 14:
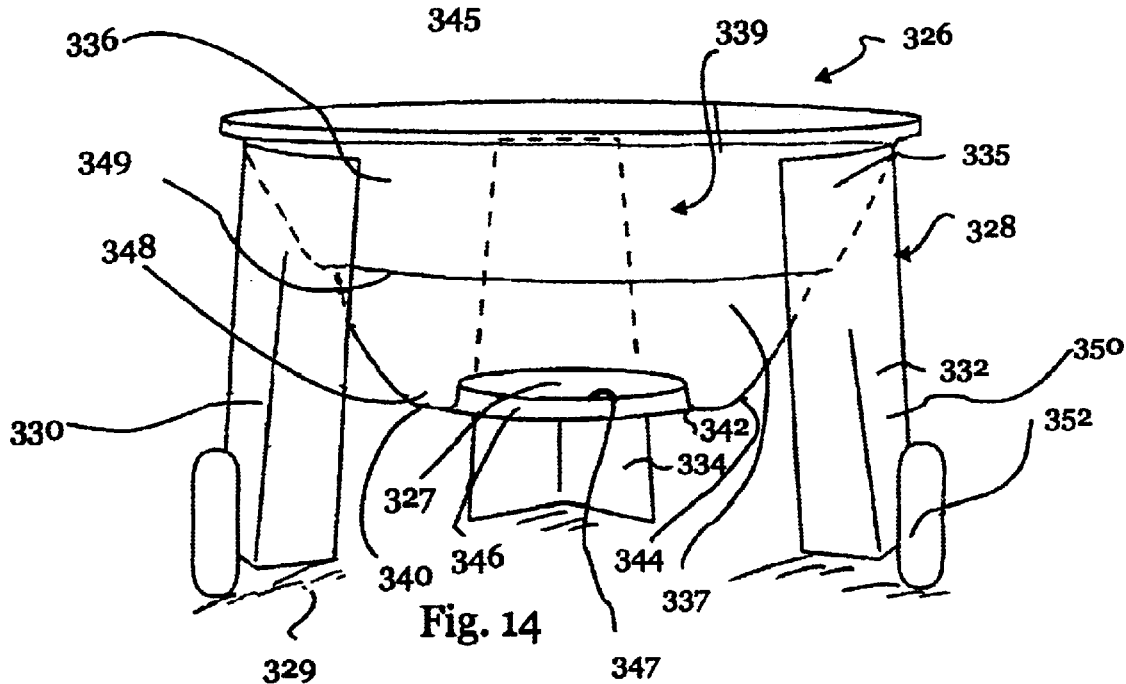
FIG. 14 shows an alternate embodiment of a base pan like that of FIG. 13 except with added legs.

FIG. 14 shows an alternate embodiment base pan 326 that includes an attached or integrated support assembly 328 which suspends the bottom plate with central opening 327 off away from underlying support surface 329. In a preferred embodiment, support assembly 328 is a tripod arrangement which is provided with two legs that include wheels and a third, longer leg member 334 which does not include a wheel to provide a position retention function. Legs 330, 332, 334 are preferably attached at their upper end (e.g., a welded or bolted conforming curved upper end region 335) to the upper section 336 of the base pan's side wall 337. Each leg is comprised of lower bent angle section 350 with two legs supporting wheels 352 which make contact with underlying support 329.

The main body 339 of base pan 326 is preferably of the same configuration as that of FIG. 13, and includes the additional secured support assembly 328 which, in this embodiment, is connected to upper section 336 by welding or the like. With a self support arrangement, bottom surface 340 includes a less of a flat bottom section (including a full curvature bottom section) with curved inner and outer conversion areas 342, 344. In any event, the raised extension 346 is spaced from lower section 337 to form channel 348. Also, rather than a stepped shoulder base pan, the base pan can feature a non-stepped cylindrical or uninterrupted curve bowl shape.

Figure 15A:
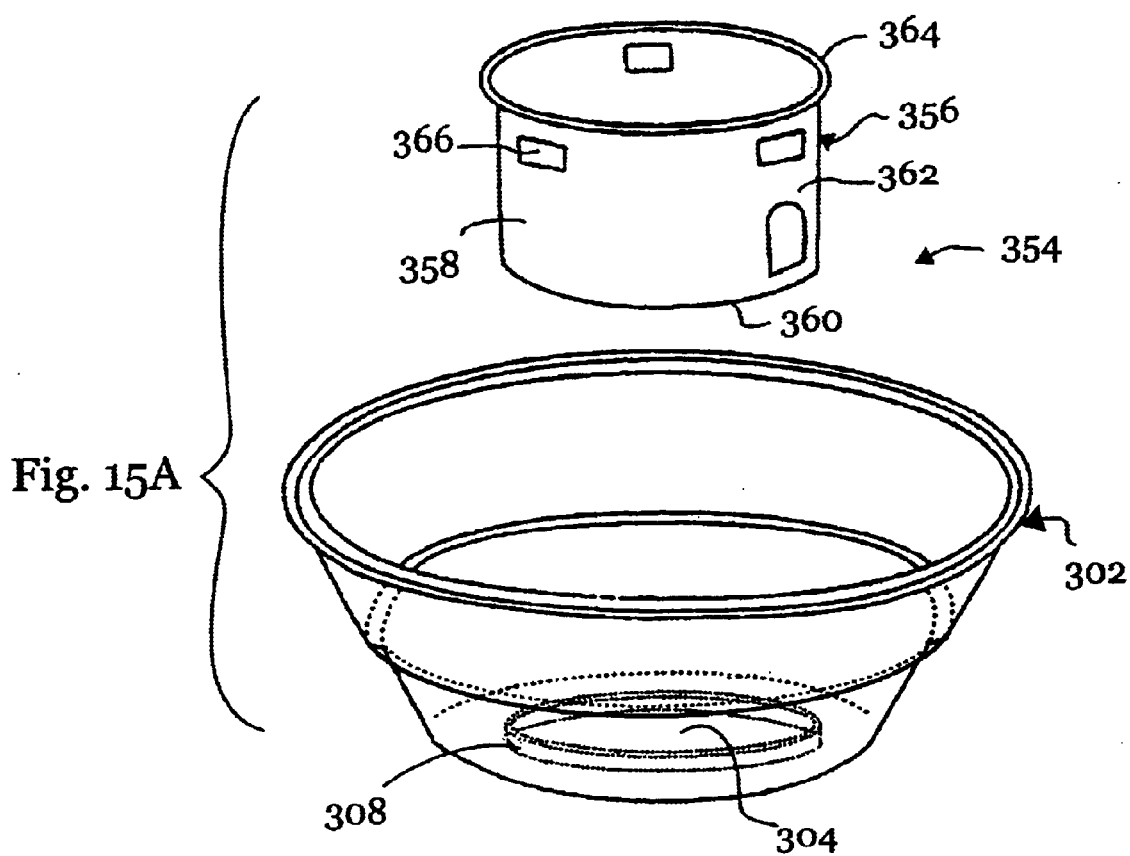
FIG. 15A shows an exploded view of a base pan fire pit assembly.

An alternate embodiment of the invention is shown in FIG. 15A and features fire pit base pan assembly 354 which includes one of the above-described base pan embodiments such as the illustrated base pan 302 together with a fire pit container 356. In the illustrated embodiment, fire pit container 356 features main cylindrical body 358 with bottom wall or base 360 and side wall 362 with upper flanged rim or lip 364 extending radially outward from the upper end of side wall 360. The exterior periphery of sidewall 360 is dimensioned to fully extend through opening 304 in base pan 302 (e.g., the full passage through the base pan hole of that portion below an enlarged capture portion such as lip flange 364). There is also preferably a sliding or small clearance arrangement between the exterior periphery of side wall 362 and the interior surface of raised extension 308 (e.g., ½ inch or less radial spacing at the point of minimum spacing difference between the main body side wall 362 and the interior surface of extension 308).

Figure 15B:
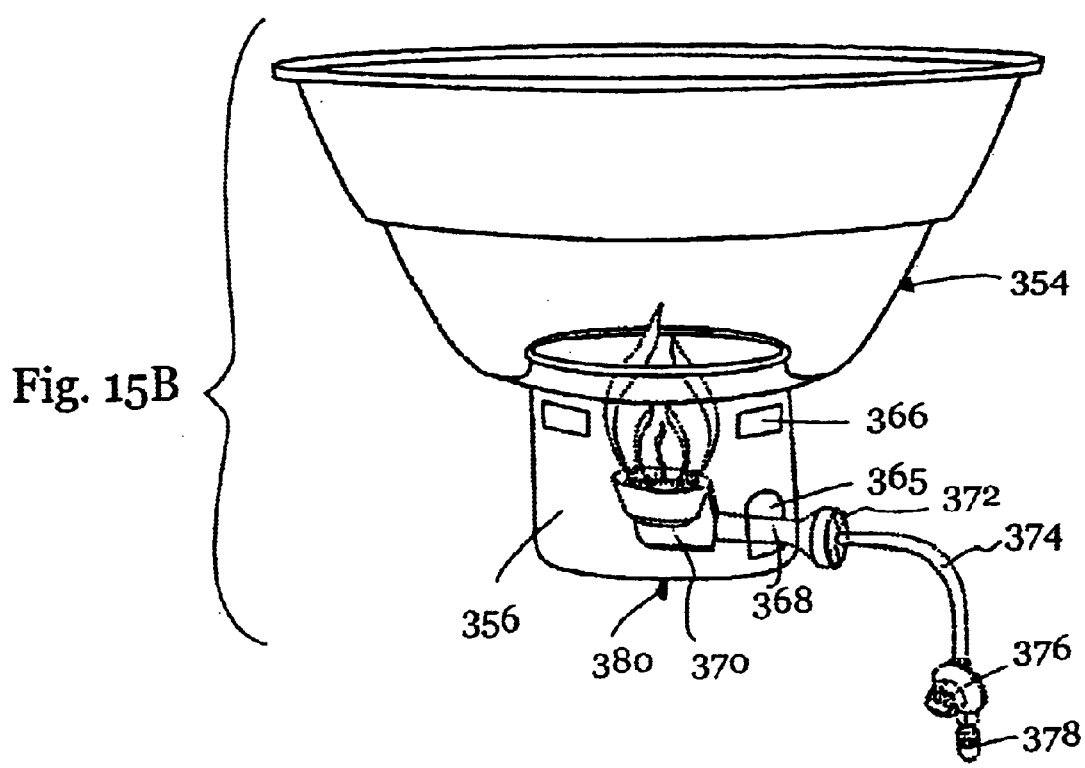
FIG. 15B shows the exploded components of FIG. 15A assembled, together with an installed burner.

In the illustrated embodiment, the preferably cylindrical shaped fire pit container 356 is suspended from the bottom of the base pan and has means for suspension support with respect to the raised extension 308. A preferred means for suspension support includes reliance on a continuous or interrupted lip flange 364 provided at the upper edge of container 356. Lip flange 364 extends radially out sufficiently far enough to both catch and be supported by the upper free edge of the raised extension 308 and thus radially exceeds the minimum spacing difference. As the container's side wall is of a diameter less than the interior side surface of the raised extension, the container can be easily inserted by insertion of the container downward through the central hole 304 until upper lip flange 364 comes in supporting contact with raised extension 308. FIG. 15B shows fire pit container in its final resting position. Fire pit container 356 can also be readily moved upward and out away from contact with raised extension when disassembly is desired.

In the illustrated embodiment of the base pan with fire pit container assembly shown in FIG. 15B, fire pit container 356 is shown in its preferred embodiment form as supporting a flame producer such as a gas (e.g., propane) burner head although other heat sources as substitutes or in addition thereto are also possible (e.g., resistance heaters, combustion material, etc.). Fire pit container 356 features reception passageway 365 formed to receive stem 368 of burner head 370 which includes adjustable air vent passageway 372 with gas conduit 374 leading to flow adjuster 376 and gas tank connector 378. Means 380 for securing the head in a stable position such as a combination of a nut/bolt assembly and a hole (not shown) for reception of the nut/bolt combination of the burner head is also provided. In addition, air vents 366 (e.g., three equally circumferentially spaced vents) are also preferably provided in the upper portion of the container's sidewall to facilitate burner operation. To provide for a suspended container arrangement, the vertical height of the container, while in a support arrangement with the base pan is of a height sufficient to place the container in a suspended state with respect to an underlying support structure (e.g., 329 in FIG. 14) above which the base pan is suspended by way of, for example, the aforementioned tripod arrangement 328. With the above described embodiment, burner head 370 is installed by threading gas tank connector 378, flow adjuster 376, gas conduit 374, the adjustable air vent passageway 372 and a portion of stem 368 through container recess 365 which is sized to allow passage of these components, but not the burner head 370 itself. This threading can take place either prior to sliding container 356 into position or after its contacting the raised extension in the base pan 354. As illustrated in FIG. 15B, the depth or vertical height of the container 356 and the securing means 380 are arranged so as to have the flame produced by burner head 370 (at least in a mid to high flame setting) extend through opening 304 and above raised extension and preferably in contact or just below a flame disk when in typical use.

As shown in FIGS. 9 to 12, the present invention also features a further embodiment of a flame disk which is particularly well suited for use in a fire pit assembly as described below and thus, for easy reference is referred to as a fire pit flame disk. The fire pit flame disk 382 preferably comprises flat bottom plate 384 with an elongated peripheral side body wall 386 extending upwardly and obliquely from the peripheral edge 388 of the base plate. Side body wall 386 features lower portion 390, intermediate stepped outward extension 392 which provides a grill rack or object holder reception support platform, and upper section 394 which preferably extends to bent upper edge 396.

Within flat plate 384 there are provided a plurality of preferably oblong shaped, radially extending holes 398 with each being surrounded by a vertically raised peripheral extension 400 so as to provide a plurality of louvers 402. The louvers extend from close to the peripheral outer edge 388 of the plate (e.g., within the radial outer 25% region of the plate) while the inner edge of each louver 402 is spaced outward from internal uninterrupted area 404 having a radial distance of at least 12% of the total radial distance of plate 384. Louvers 402 preferably extend across at least a majority of the radial distance of the base plate and preferably 60 to 80% of that distance.

The raised extension 400 which together with hole 398 defines louver 402 is sufficiently high to trap drippings from food products above the base or bottom plate 384 and to provide for water steaming. That is, liquid is retained external to the extensions 400 periphery and internal to the side body wall 390.

To further prevent drippings and other liquids from dripping below the flame disk and to provide for a high quality dissipation of heat while avoiding direct flame contact on food stuffs, louver covers 406 are positioned above each upper edge of the raised louver extensions 400.

Each louver 402 (e.g., three equally circumferentially spaced) is covered over with a louver cover 406 with each louver cover 406 having a sufficient width so as to cover the widest portion of each hole 398 and preferably overlap (e.g., a quarter to a third width section extending outward from a respective louver outermost edge to form an overlap the same).

Preferably, each louver cover 406 is independent of the raised extension 400 both from a radial contact with plate positioning standpoint and a height clearance stand point. A preferred embodiment of the fire pit flame disk 382 features an internal louver cover section 408 which is connected to the uninterrupted central area 404 of the flame disk's base plate 384 between the center point of the plate and the interior edge of an adjacent most raised louver extension 400. For example, a welded bent tab 410 secured to the plate with an upwardly extending portion 412 positioned at an internal end of the cover. Extending outwardly from the cover's internal section is intermediate cover section 414 which includes a hole covering portion preferably in the form of a strip of material that extends radially internally of the inner end of the raised louver extension to a location radially externally of the outer end of the raised louver extension. In a preferred fire pit flame disk 382 embodiment, hole covering portion 414 extends to side body wall attachment section 416 and is preferably in the form of an upwardly bent tab that is angled to conform to divergent side body wall 396 of the flame disk (e.g., welded tab) at a location below the stepped shoulder 392 formed in the fire pit flame disk side wall. Hole covering portion 414 preferably is a flat metal strip (part of an overall unitary strip of material) extending parallel to the flame disk's base plate 384 and at a height above and also in parallel fashion with the upper edge of the louver extensions 400. This arrangement allows for heat dispersion via a flow of air within and out away from the clearance spaces between the upper edge 418 of the raised extension and the above positioned hole covering portion 414. Also, by having hole covering portion 414 spaced below the level of the grill supporting stepped shoulder 392 in the fire pit flame disk 382 heat is also more readily free to flow in a convective current above the hole covering portion and below the grill when in place. Alternatively, the hole covering portions and/or the sidewall body can be provided at a height in common with a horizontal plane extending from the contact portion of the grill support shoulder to provide an internal support region for grill rack or object holder (e.g., a holder for a replacement or supplemental heat source such as logs).

One embodiment of the fire pit flame disk features suspension support 420 such as a plurality of circumferentially spaced legs 422 which extend down from an attachment location with either the side body wall 390 and/or the base plate 384. In a preferred embodiment there are a plurality of circumferentially spaced legs 422, each having an upper leg section 424 and a lower contact leg section for contact with an underlying support of, for example, a channel region (325, 340) of a base pan. In a preferred embodiment like that shown in FIGS. 11 and 12, there are an equal number of legs 422 as louver holes with the legs being equally circumferentially spaced apart from each other and at a location between an adjacent pair of the louver holes 398. The legs also are preferably formed of strip material that is bent into an L-shape with horizontal section 424 attached or otherwise welded to the bottom of the flame disk base plate and the lower, contact leg section 426 extending vertically down in a transverse relationship with the attached section.

The height of the vertical extension portion of the legs is sufficient to place the flame disk's base plate above, in a height clearance relationship, the upper edge of the base pan's central hole defining raised extension (e.g., 345 in FIG. 13 or 347 in FIG. 14) or with respect to the lip flange of a fire pit burner container support flange supported on the central hole extensions' upper edge. In this way, a convective flow of heat is possible—radially and between the circumferentially spaced flame disk legs and along and over the side body wall of the flame disk, while the flame disk also acts to retain and equally disperse the heat generated by the burner below.

FIG. 16 shows cooking assembly 428 comprising dome cover 430, cylindrical extension 432 and base pan 326' which is the same as base pan 326 except for modified integrated support assembly 328' which features a modified leg arrangement with each leg 434 comprising an upper leg branch extension 436 attached (e.g., welded or bolted) to upper section 438 of main body 440 of base pan 326' and a lower leg branch extension 442 attached to lower section 444 of main body 440. In the embodiment shown in FIG. 16, cooking assembly 428 further features a flame disk such as the illustrated fire pit flame disk 382 having its legs 422 supported in the channel region of base pan 326' and having its bottom plate spaced above both the upper edge of the base pan's raised extension 346 and the upper extremity of lip flange 364 of fire pit container 356. FIG. 16 also shows a heat source provided in container 356 which is represented by burner head 370, which directs its flame through the opening such that the majority of the flame's radial dispersion contacts the uninterrupted area of the flame disk so as to cause an outward radial dispersion along the bottom of the plate.

As shown in FIG. 16, upper flanged rim 318 of flame disk 382 is positioned below a horizontal plane contacting stepped shoulder 349. Flame disk 382 is shown in dashed lines to illustrate the versatility of the present invention in that a cooking assembly can be provided that includes flame disk 382 with a grill on its stepped shoulder with the combination supported in the channel region of the base pan, or an assembly that includes flame disk 382 without a grill rack supported and with the base pan supporting a grill rack on its upper flanged rim, or a cooking apparatus which is free of the flame disk to allow direct flame heating of a grill on the upper flange of the base pan.

FIG. 17 shows an alternate embodiment cooking assembly 428' which is similar to that of FIG. 16 except for base pan 302' being more similar to base pan 302 in FIG. 15A in its being free of an integrated support. Base pan 302' is also shown with additional (optional) handles 446. Base pan 302' can be directly supported on an outdoor cooking burner stand such as in the arrangement shown in FIGS. 4 and 8 of the present application or on a stand alone support assembly such as support assembly 448 shown in FIG. 17 which features a similar tripod arrangement as described above, but with an upper continuous ring (partially shown in cut away) 450 which is sized to come in underlying supporting contact with shoulder 314 of base pan 302' or a higher height tripod arrangement which engages the upper flange (e.g., 320) of the base pan.

Figure 18:
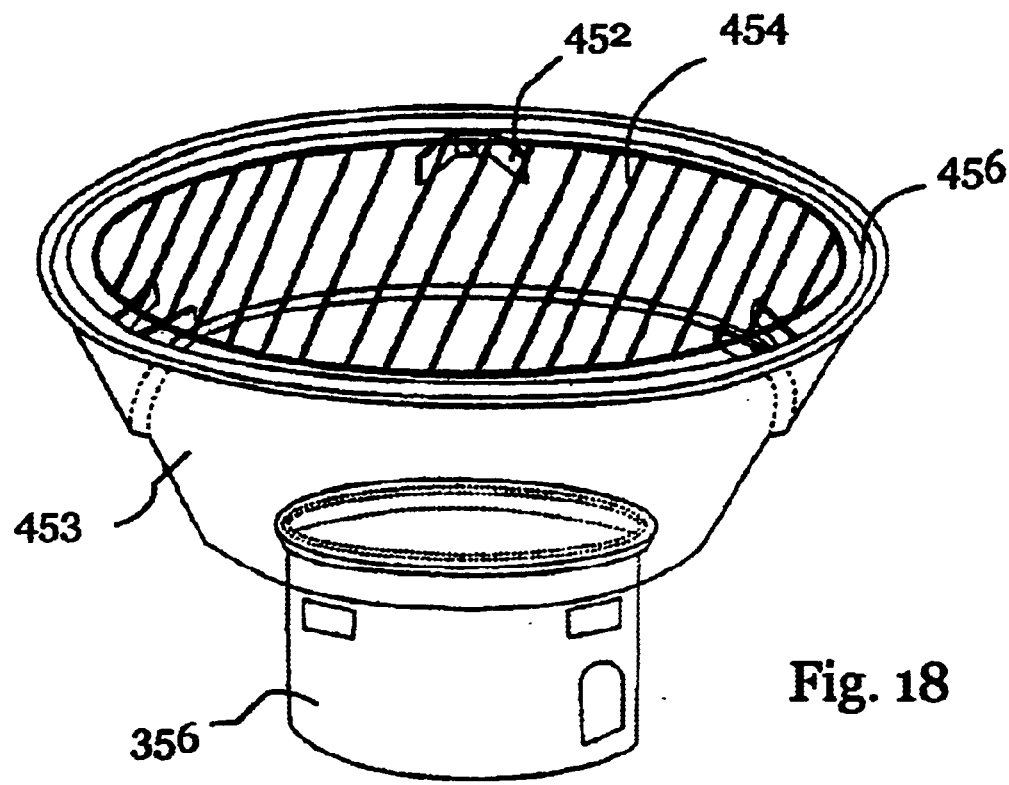
FIG. 18 shows a fire pit base pan assembly shown in FIG. 15A with added grill rack and grill rack supports.

FIG. 18 shows fire pit base pan assembly 451 which comprises base pan 453, which is similar to base pan 310 in FIG. 13, but includes added grill clips 452 for supporting an appropriately sized grill rack 454 inward of flanged upper rim 456 so as to leave the entire rim available for cover, smoker extension or other cooking apparatus component support.

Figure 19:
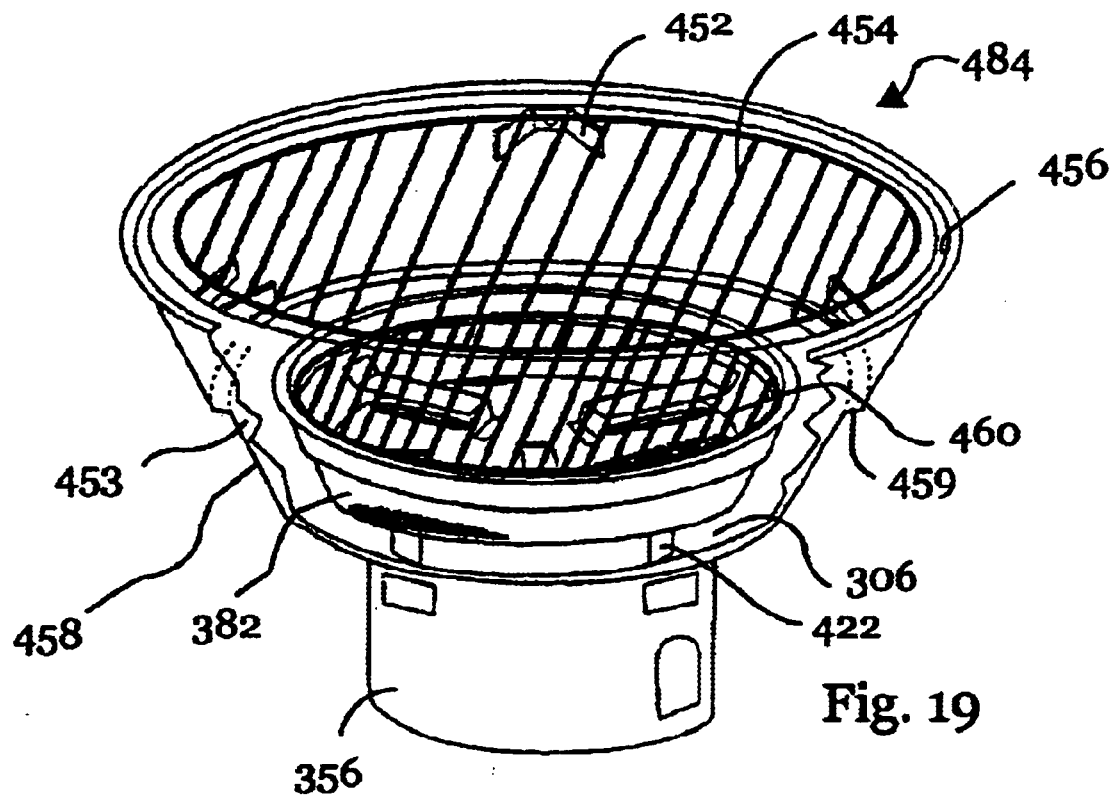
FIG. 19 shows the fire pit base pan assembly of FIG. 18 together with a fire pit flame disk with its own grill rack.

FIG. 19 shows a similar view as that in FIG. 18 except for the addition of a flame disk such as the earlier described flame disk 382 whose legs 422 extend down into supporting contact with the base pan's channel 306.

As seen from FIG. 19, flame disk 382 has an outer periphery that extends radially out past the central opening (both its base and larger diameter upper rim in this embodiment), but is also of a maximum diameter that is less than the corresponding portion of lower section 458 of base pan 453. The diameter of fire pit container 356 is thus also less than the covering base of flame disk 382. FIG. 19 further illustrates grill or support rack 460 resting on the stepped shoulder of flame disk 382.

Figure 20:
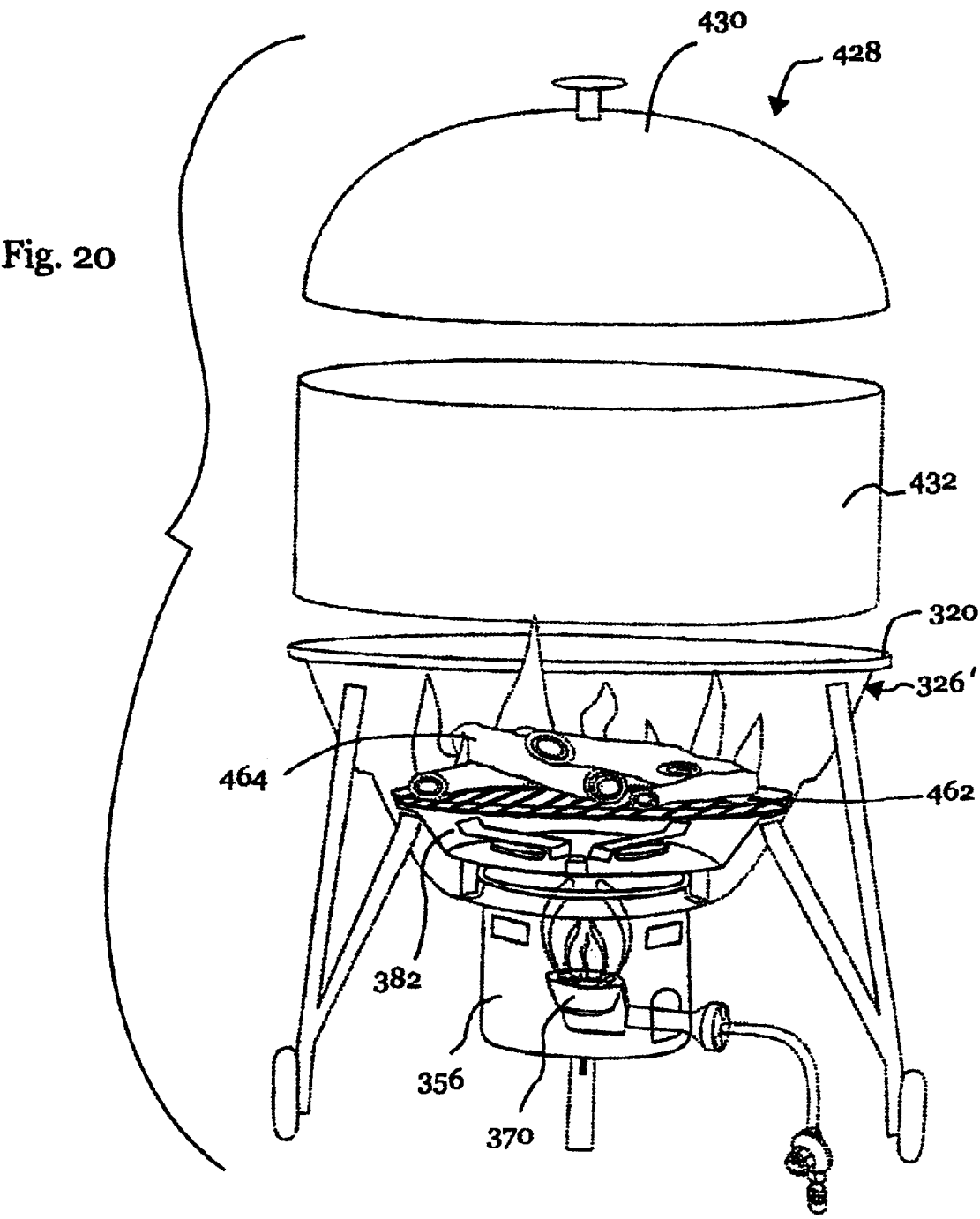
FIG. 20 shows a cooking assembly similar to that shown in FIG. 16 except for an additional flame disk grill rack supporting logs that have been ignited by the burner below.

FIG. 20 shows the cooking assembly 428 in FIG. 16 with the additional inclusion of grill or holder rack 462 resting on the stepped shoulder of flame disk 382. In addition, FIG. 20 shows the inclusion of logs 464 on rack 462 which can function as a supplement heat source once ignited or as the sole heat source following ignition and the shutting off burner head 370. The support rack or holder 462 is positioned at a height relative to burner 370 such that the flame produced by burner 370 can ignite the logs 464 (e.g., at a higher end gas flow setting). Thus, a container or food stuff can be positioned on a second grill rack supported by the upper extension of the base pan (e.g., 320 in FIG. 19) for cooking. Rack holder 462 can also take on a variety of other forms suited for either supporting supplemental or replacement heating material (e.g., combustibles such as the logs or charcoal), heat retainers such as lava rocks or heat embers, a water bowl for steam generation, etc. Also, as schematically represented in FIG. 20, the diameter of the outer extremity of the stepped shoulder in the flame disk preferably represents about 40–80% of the maximum radius of the base pan, and more preferably, the stepped shoulder radius is in the 50 to 70% range as to the maximum base pan radius. The stepped shoulder in the base pan is preferably at the half way mark with respect to base pan height, and the stepped shoulder of the base pan is preferably in the range of 20 to 50% of the height.

Figure 21:
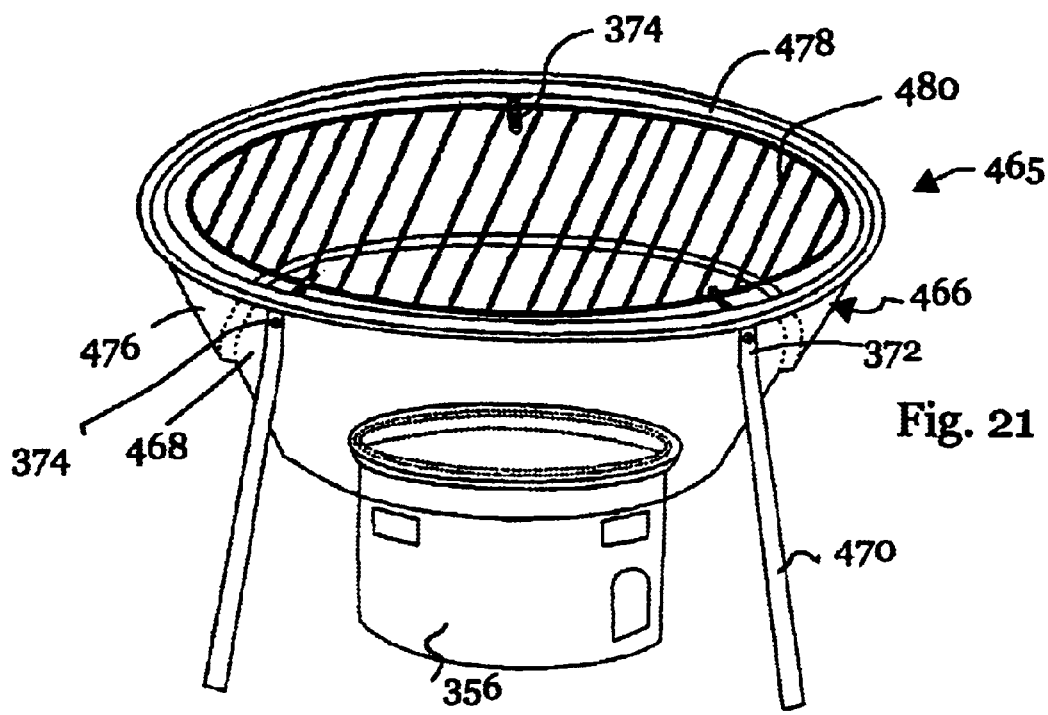
FIG. 21 shows a modified fire pit base pan assembly with supported grill rack.

FIG. 21 shows an alternate embodiment for pit base pan assembly 465 with fire pit container 356 and base pan 466. Base pan 466 comprises main body base pan bowl 468 with three single rod support legs (two shown) 470 each having an upper bent conforming section 372 through which bolt 374 extends. Bolts 374 extend radially inward through the main body (in a region somewhere within the range of height of upper section 476 and preferably within one or two inches of upper flanged rim 478) and with the upper end of each leg 470 contacting the underside of flanged rim 478. Base pan grill rack 478 is supported on the three bolts 374.

Figure 22:
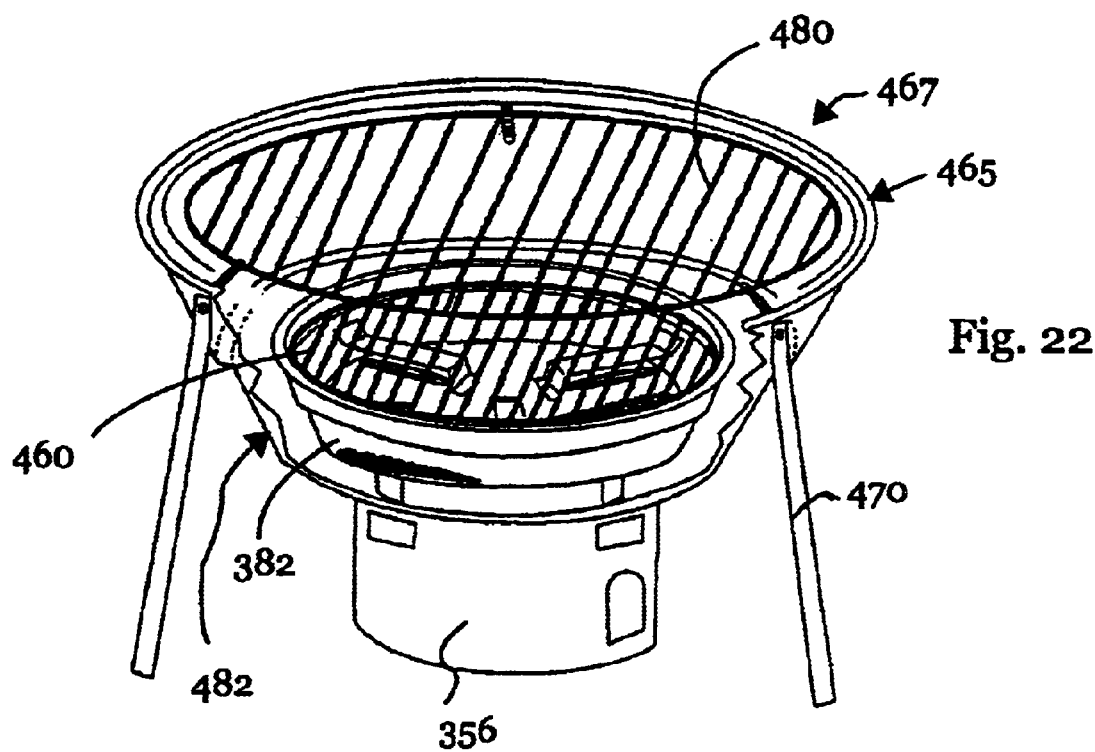
FIG. 22 shows a similar view as that of FIG. 21 together with a fire pit flame disk with supported grill rack.

FIG. 22 shows the same view as in FIG. 21 together with flame disk 382 with holder rack 460 which are positioned in lower section 482 of the base pan.

Figure 23:
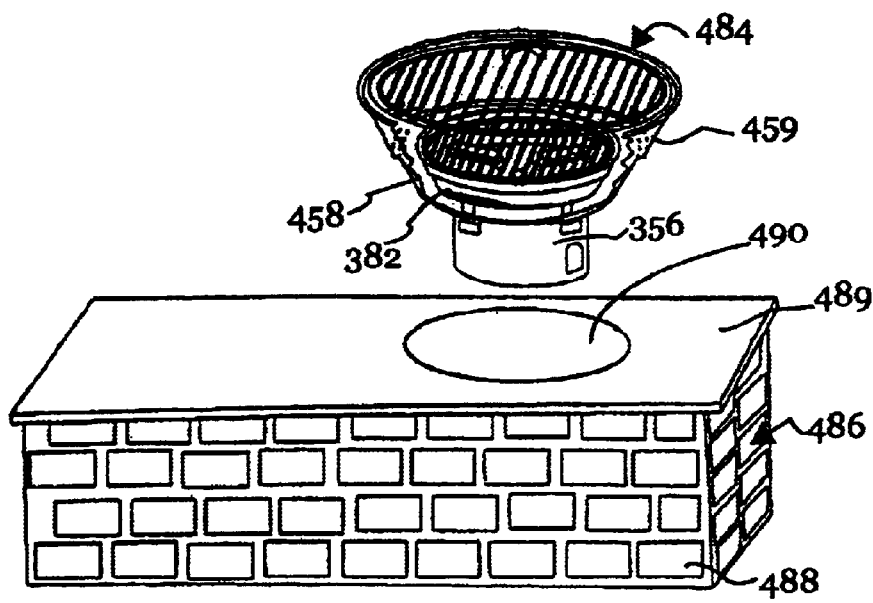
FIGS. 23–25 show a stationary support embodiment of the invention.
Figure 24:
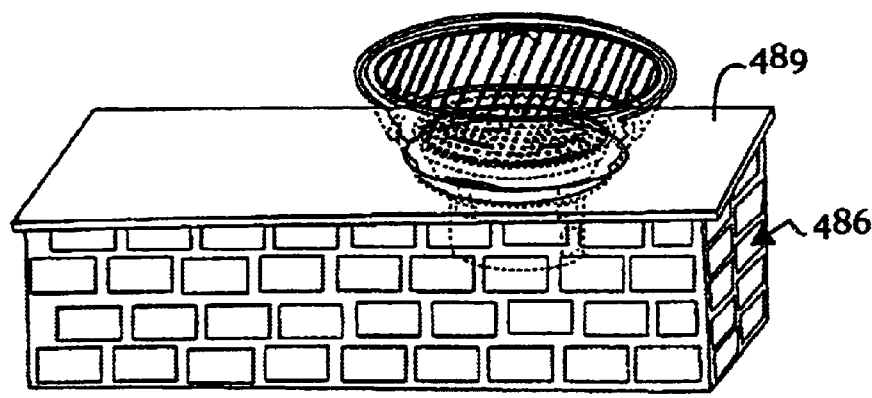
Figure 25:
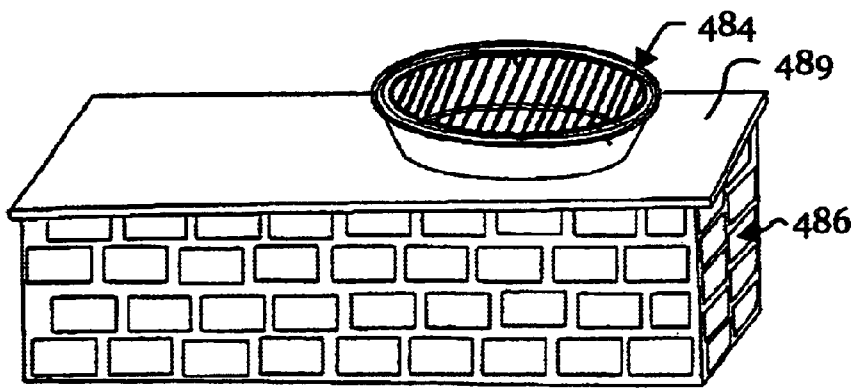

FIG. 23 shows cooking assembly 484 (as shown in FIG. 19) in a pre-position state with respect to stationary support structure 486. Stationary support structure 486 includes fixed lower brick base 488 with upper counter top having opening 490, which in this embodiment has a diameter greater than or essentially equal to the maximum diameter of lower section 458, but less than that of stepped shoulder 459. FIGS. 24 and 25 show the installation of cooking assembly 484 with respect to stationary support 486. In FIG. 24, fire pit container 356 and a portion of lower section 458 has been inserted through opening 490. FIG. 25 shows cooking assembly 484 in its final support state wherein the lower end of fire pit container 356 is in a suspended state (due to the relative height of brick base 488).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A smoker grill assembly, comprising:

a cover;

an intermediate insert having a first end for cover support and a second end;

a base pan having an upper end which is dimensioned to releasably receive and support the second end of said intermediate insert, said base pan having a lower base section which is configured for contact with a supporting region of an outdoor cooker, said base pan further comprising a plurality of circumferentially spaced legs that are dimensioned to extend below the lower base section of the base pan so as to extend below the supporting region of the outdoor cooker when supported on an outdoor cooker, said base pan further comprising an air infeed aperture formed in a side wall of said base pan and wherein said side wall includes an annular step region extending radially outward from said lower base section, and said legs extending above and below said step region.

2. The assembly of claim 1 wherein said base pan comprises a plurality of air infeed apertures circumferentially spaced about the side wall of said base pan.

3. The assembly of claim 2 wherein the air infeed apertures are radially aligned with respective legs.

4. The assembly of claim 1 wherein said legs extend along the side wall of the base pan and are fastened to an external side of said side wall.

5. The assembly of claim 4 wherein said legs extend from the lower base section to the upper end of the base pan.

6. The assembly of claim 5 wherein said legs have sections that extend inward relative to a radial outermost portion of said legs for stand alone ground contact when not supported by the outdoor cooker.

7. The assembly of claim 1 further comprising a bottom aperture in the bottom of said base pan.

8. The assembly of claim 1 wherein said intermediate insert includes a pair of handles and said cover has a top handle.

9. The assembly of claim 1 wherein said base pan has an outwardly extending upper rim flange with a beaded outer periphery and said rim flange being dimensioned for supporting contact with the intermediate insert.

10. The assembly of claim 9 further comprising a grill rack and said base pan including a grill rack support at the upper end of said base pan.

11. The assembly of claim 10 wherein said grill rack support comprises fasteners fastening the legs to the base pan.

12. The assembly of claim 1 wherein said legs have a channel shaped cross-section.

13. The assembly of claim 1 further comprising rack supports which extend radially inward in said base pan in a rack support position and rack fasteners, said rack fasteners being positioned so as to secure both said rack and said legs to said side wall.

14. The assembly of claim 1 wherein said step region is a continuous annular step region defining an annular clearance region between an interior surface of said legs and said lower base section.

15. The assembly of claim 1 wherein said legs have an upper interior surface which contacts said side wall above said step region and a radially inwardly extending protruding interior surface section which extends radially inward and directly below said step region.

16. A smoker grill assembly, comprising:
a cover;
an intermediate insert having a first end for cover support and a second end;
a base pan having an upper end which is dimensioned to releasably receive and support the second end of said intermediate insert, said base pan having a lower base section which is configured for contact with a supporting region of an outdoor cooker, said base pan further comprising a plurality of circumferentially spaced legs that are dimensioned to extend below the lower base section of the base pan so as to extend below the supporting region of the outdoor cooker when supported on an outdoor cooker, said base pan further comprising an air infeed aperture formed in a side wall of said base pan, and said assembly further comprising a bottom aperture in the bottom of said base pan, and wherein said bottom aperture is defined by a flange section of said base pan.

17. A smoker grill assembly, comprising:
a cover;
an intermediate smoker insert having an upper end which receives in supporting fashion said cover; and
a base pan having an upper end which receives in supporting fashion a lower end of said intermediate smoker insert, a side wall and a lower base section which is configured for contact with a supporting region of an outdoor cooker, said base pan further comprising a plurality of spaced apart legs that are dimensioned to extend below the lower base section and radially outward of said lower base section for circumferential confinement of the outdoor cooker when said base pan is in use; and
wherein said lower base section has an opening formed therein and an annular extension extending from the opening to said side wall, and said opening being defined by a flange section formed in the lower base section.

18. The assembly of claim 17 wherein the opening of said lower base section has a diameter greater than the radial extension of the annular extension.

19. The assembly of claim 17 further comprising a removable flame cover which is supported by said base pan so as to be in a suspended state over the opening in the bottom portion.

20. The assembly of claim 19 wherein the flange section extends upwardly so as to position an upper edge of the flange section below a lower surface of said flame cover, and said flame cover having a plurality of legs which are in contact with the annular extension.

21. A smoker grill assembly, comprising:
a cover;
an intermediates insert having a first end for cover support and a second end;
a base pan having an upper end which is dimensioned to releasably receive and support the second end of said intermediate insert, said base pan having a lower base section which is configured for contact with a supporting region of an outdoor cooker, said base pan further comprising a plurality of circumferentially spaced legs that are dimensioned to extend below the lower base section of the base pan so as to extend below the supporting region of the outdoor cooker when supported on an outdoor cooker, said base pan further comprising an air infeed aperture formed in a side wall of said base pan; and
an outdoor gas cooker which contacts said base pan.

22. The assembly as recited in claim 21 wherein the side wall has multiple air infeed ports which are circumferentially spaced.

23. A smoker grill assembly, comprising:
a cover;
an intermediate insert having a first end for cover support and a second end;
a base pan having an upper end which is dimensioned to releasably receive and support the second end of said intermediate insert, said base pan having a lower base section which is configured for contact with a supporting region of an outdoor cooker, said base pan further comprising a plurality of circumferentially spaced legs that are dimensioned to extend below the lower base section of the base pan so as to extend below the supporting region of the outdoor cooker when supported on an outdoor cooker, said base pan further comprising an air infeed aperture formed in a side wall of said base pan, and said assembly further comprising a bottom aperture in the bottom of said base pan, and a flame cover positioned in contact with said base pan and over said bottom aperture and so as to be in alignment with a flame generator of the outdoor cooker, when in use.

24. The assembly of claim 23 wherein said flame cover has a flame barrier disk and a plurality of support legs supporting the flame barrier disk above the bottom aperture in said base pan.

25. The assembly of claim 24 wherein said flame barrier disk has a louver hole formed therein and a louver hole cover extending over said louver hole in the flame barrier disk.

26. A smoker grill assembly, comprising:

a cover;

an intermediate smoker insert having an upper end which receives in supporting fashion said cover;

a base pan having an upper end which receives in supporting fashion a lower end of said intermediate smoker insert, a side wall and a lower base section which is configured for contact with a supporting region of an outdoor cooker, said base pan further comprising a plurality of spaced apart legs that are dimensioned to extend below the lower base section and radially outward of said lower base section for circumferential confinement of the outdoor cooker when said base pan is in use, and a gas flame generator and flame generator support stand which support stand positions the flame generator off the ground.

27. The assembly as recited in claim 26 wherein said base pan features a horizontally arranged annular extension and an outwardly diverging side wall, with a lower end of said side wall being circumferentially encompassed by an upper ring portion of said flame generator support stand.

28. A smoker grill assembly, comprising:

a cover;

an intermediate smoker insert having an upper end which receives in supporting fashion said cover;

a base pan having an upper end which receives in supporting fashion a lower end of said intermediate smoker insert, a side wall and a lower base section which is configured for contact with a supporting region of an outdoor cooker, said base pan further comprising a plurality of spaced apart legs that are dimensioned to extend below the lower base section and radially outward of said lower base section for circumferential confinement of the outdoor cooker when said base pan is in use, and a flame disk positioned radially inward of the spaced apart legs and at a location which blocks burner flames of the outdoor cooker when said base pan is in use.

29. The assembly of claim 28 further comprising a water pan supported by said base pan and positioned above said flame disk.

30. The assembly of claim 29 further comprising a grill rack supported by said base pan and positioned above said water pan.

31. A smoker grill assembly, comprising:

a cover;

an intermediate smoker insert having an upper end which receives in supporting fashion said cover;

a base pan having an upper end which receives in supporting fashion a lower end of said intermediate smoker insert, a side wall and a lower base section which is configured for contact with a supporting region of an outdoor cooker, said base pan further comprising a plurality of spaced apart legs that are dimensioned to extend below the lower base section and radially outward of said lower base section for circumferential confinement of the outdoor cooker when said base pan is in use; and wherein said base pan includes an annular rim extending radially outward from an upper end of said lower base section to said side wall, and wherein said legs extend above and below said annular rim.

32. The assembly of claim 31 wherein said legs are secured to said side wall and are circumferentially spaced from said lower positioned base section for providing an annular clearance region between an interior surface of said legs and said base section.

33. The assembly of claim 31 wherein said legs have a channel shaped cross-section.

34. The assembly of claim 31 further comprising rack supports which extend radially inward in said base pan in a rack support position and rack fasteners, said rack fasteners being positioned so as to secure both said rack and said legs to said side wall.

35. A smoker grill assembly, comprising:

a cover;

an intermediate smoker insert having an upper end which receives in supporting fashion said cover;

a base pan having an upper end which receives in supporting fashion a lower end of said intermediate smoker insert, a side wall and a lower base section which is configured for contact with a supporting region of an outdoor cooker, said base pan further comprising a plurality of spaced apart legs that are dimensioned to extend below the lower base section and radially outward of said lower base section for circumferential confinement of the outdoor cooker when said base pan is in use, and an underlying base pan support having an annular ring which abuts an annular rim of said base pan.

36. The assembly of claim 35 further comprising a flame disk in contact with the base pan and positioned so as to block flames from an underlying burner and to distribute heat, and said base pan having air entry ports formed therein above a level of said flame disk.

37. The assembly of claim 36 further comprising a water pan supported by said base pan and positioned above said flame disk, and a grill rack supported by said base pan and positioned above said water pan.

38. The assembly of claim 35 wherein said annular ring extends radially between said base pan lower section and said spaced apart legs.

* * * * *